United States Patent [19]

Jusko et al.

[11] 4,121,058

[45] Oct. 17, 1978

[54] VOICE PROCESSOR

[75] Inventors: Stephen C. Jusko, Point; Thomas C. Tillotson, Greenville, both of Tex.

[73] Assignee: E-Systems, Inc., Dallas, Tex.

[21] Appl. No.: 749,999

[22] Filed: Dec. 13, 1976

[51] Int. Cl.[2] .............................................. G11B 13/00

[52] U.S. Cl. .............................................. 179/15.55 T

[58] Field of Search ................. 179/1 A, 1 SA, 1 SG, 179/1 SM, 15.55 T; 364/900 MS File, 200 MS File, 900

[56] References Cited

U.S. PATENT DOCUMENTS

| | | | |
|---|---|---|---|
| 3,883,850 | 5/1975 | Martin et al. | 364/200 |
| 3,949,175 | 4/1976 | Tanizoe et al. | 179/15.55 T |
| 3,976,842 | 8/1976 | Hoyt | 179/15.55 T |
| 4,016,540 | 4/1977 | Hyatt | 179/1 SM |
| 4,020,291 | 4/1977 | Kitamura et al. | 179/15.55 T |

*Primary Examiner*—Gareth D. Shaw

*Assistant Examiner*—Michael C. Sachs

*Attorney, Agent, or Firm*—Robert V. Wilder

[57] ABSTRACT

Audio data is converted into a digital format at a selectable conversion rate and applied through a microprocessor into memory storage. Stored data is selectively recalled and reconverted into an analog format for reconstruction into human speech at a processing rate independent of the input storage rate. The write pointer address and the read pointer address during the storage and retrieval of data are maintained within a selected address differential in accordance with the input data rate and the processing rate. To repeat the retrieval of particular stored data from selected address locations, the data input storage is interrupted thereby holding in memory a selected portion of previously stored data. The amount of data retrieved during the repeat process is varied by controlling the write pointer and the differential address between the write pointer and the read pointer.

27 Claims, 12 Drawing Figures

VOICE PROCESSOR

This invention relates to apparatus for processing voice signals, and more particularly to apparatus and the method of processing voice signals at variable rates.

A voice processor in accordance with the present invention and its associated control form a complete, highly flexible audio processing system designed to increase operating speed and efficiency in analyzing recorded voice signals. Such a voice processor provides solid state storage for a signal segment for a given time span and allows such signals to be analyzed at reproduce/record speed ratios (output/input) ranging from half normal voice rate to over twice normal voice rate.

The processing of recorded speech requires an operator to produce a summary, an extract, a translation, or a transcript of the recorded material. These tasks are accomplished more efficiently with the present invention, as compared with prior available recording apparatus, since the system incorporates the ability to vary the speech rate (with pitch restoration) and a recall of selected segments of the recorded material.

In the past, techniques for voice processing utilized at best a single speed recorder for a magnetic tape loop with which to solve voice reproduction problems. Such techniques are difficult and time consuming because an operator has no control over listening speed and little or no control over the length of the recalled segments or the rate at which the segment is repeated. An expanded discussion of the prior art of voice processing is given in the "Background of the Invention" in U.S. Pat. No. 3,786,195, directed to a variable electrical delay line signal processor for sound reproduction. The system as described and claimed in U.S. Pat. No. 3,786,195 is also the subject of a technical article entitled "Playback Control Speeds or Slows Tape Speech Without Distortion" by Murray Shiftman, *Electronics,* August 22, 1974.

The voice processor of the present invention when used in conjunction with a variable speed tape recorder provides a significant increase in operator efficiency relative to the prior art single speed tape processing systems incorporating a magnetic tape loop. Voice signals from the variable speed tape recorder are converted continuously into a digital format and stored in solid state memory. The voice signals are restored with minimum pitch distortion in a variable speech rate (VSR) mode. Upon operator selection of a loop mode, any selected portion of the stored record may be recalled and reproduced continuously at a speech rate with appropriate correction.

Further, the operator has the capability of using a fast playback rate to decrease the time involved in analyzing the recorded speech. For example, he can perform the work which would normally take two hours in one hour by using the variable speech rate mode and working with a reproduce/record speed equal to twice normal voice communication, with only a minimum of voice distortion. Typically, an operator selects a speech rate at as fast a playback as possible without loss of comprehension and then switches into the loop mode for selected recall to resolve questionable phrases.

An operator has available at all times the means to select a slow playback rate to extract a verbatim record of a particular segment of interest. If necessary, a particular segment can be selectively recalled and repeatedly examined for pertinent words, syllables, or portions of a syllable at a variable speech rate. The playback rate is varied in proportion to the difficulty of understanding and transcribing the recorded material, which is a definite aid in the production of a transcript.

The desired goal could be a summary, an extract, or a transcript of a translation of recorded audio data. Since the operator is listening in one language and producing a record in another language, variable speech rate, selective recall, and a combination of both can be applied effectively.

To effect the above advantages of the present invention, the voice processor includes a central controller that functions as both a control and processing element. Control functions include input/output data transfer between signal ports and memory, operator control panel functions, and VSR and loop mode memory address control. Processing functions include companding, thresholding, windowing, and removal of periodic distortion components from the processed voice signal.

A feature of the present invention relative to prior art speech processors is the interaction between the variable speech rate (VSR) mode and the loop mode. It is operationally desirable to have the ability to listen to a speech at a playback rate in the VSR mode (reproduce/record speeds greater than one) and to switch to the loop mode and be able to vary the effective speech rate without introducing pitch distortion. This allows an increase through put for the majority of information by retaining capability for detailed analysis of selected information. Segments are deleted from the playback waveform for speed-up operation to form a pitch restored waveform. To maintain distortionless loop capability, the deleted segments are retained in data memory.

Another unique feature of the present invention is the ability to vary the effective speech rate in the loop mode. Thus, the rate of the recurrent speech patterns available in the loop mode may be varied from half to over twice of normal with pitch restoration. This can be used to considerable advantage for clarification or as an aid to education.

In accordance with the present invention, apparatus for processing variable rate voice signals include data storage means for storing digital data representing voice signals. Digital data representing a voice signal is transferred to the data storage means at an input rate and retrieved from the data storage means at a processing rate independent of the input rate. The retrieved digital data is applied to a converter for generating a voice signal in analog format from the retrieved data at the processing rate.

A more complete understanding of the invention and its advantages will be apparent from the specification and claims and from the accompanying drawings illustrative of the invention.

Referring to the drawings.

Figure 1:
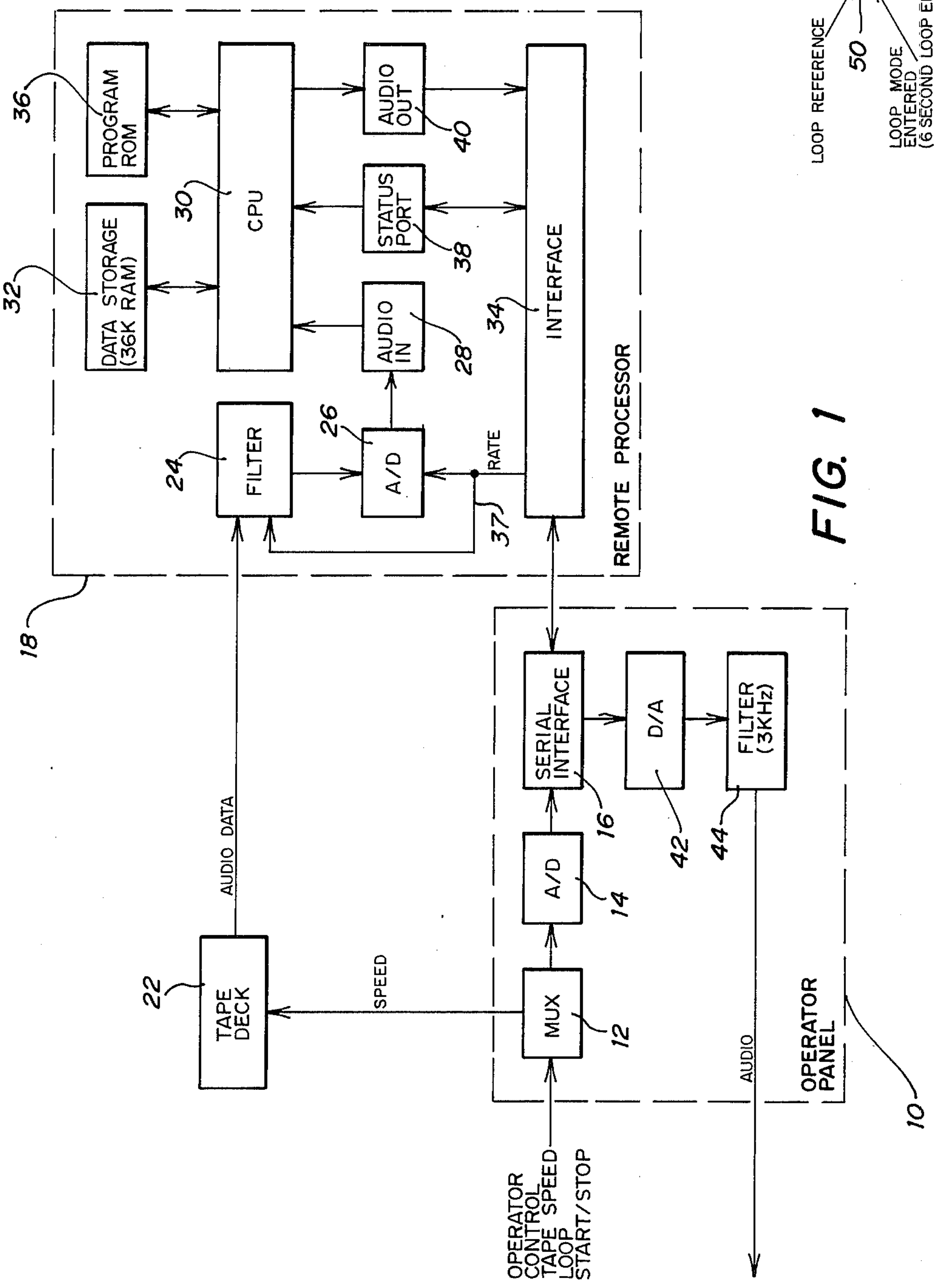
FIG. 1 is a block diagram of a single channel voice processor in accordance with the present invention.

The implementation shown in FIG. 1 is that of a single channel voice processor system, however, the electronics and memory of FIGS. 2 and 9–11 have been provided for a two channel system. The invention will be described with reference to a single channel system, it being understood that a considerable part of the electronics shown enables two channel operation.

Referring to FIG. 1, operator control functions including the playback speed, loop start and stop limits and system operating mode; i.e., variable speed rate mode or loop mode, are inputs to an operator's panel. Analog values of the control functions are applied to control electronics 10 including a multiplexer 12 wherein the analog values of the control functions are multiplexed sequentially into an analog-to-digital converter 14. In the analog-to-digital converter 14 the control functions are each converted into an eight bit digital word having a value related to the values of the operator control functions. These digital words are transmitted through serial interface logic 16 to a remote processor 18.

For purposes of understanding the invention processing rates, control frequencies, frame rates, loop storage times and clocking functions will be assigned selected values. It being understood that these values are representative only and do not constitute critical limitations on the operation of the system.

Analog values of the speed control functions from the multiplexer 12 are also applied to a tape transport 22. As control data is sent to the voice processor 18 through the serial interface 16, voice data is also received by the voice processor from the tape transport 22 and applied through an aliasing filter 24 to an analog-to-digital converter 26. The audio data is converted into a digital format and applied to audio input port 28 for processing through a central processing unit 30 to a data storage memory 32.

The rate of conversion and storage is controlled by interface logic 34 in accordance with the operator control functions transmitted through the serial interface 16. The analog-to-digital conversion rate of the voice data is controlled by a rate signal on a line 37 connected to both the analog-to-digital converter 26 and the aliasing filter 24.

Variable bandwidth audio information from the tape deck 22 is thus digitized at a rate consistent with its bandwidth; that is, 6 KHz at a unity reproduce/record ratio, 12 KHz for a 2:1 reproduce/record ratio, and 3 KHz for a 0.5:1 reproduce/record ratio. As each sample of the audio data is converted into a digital format it is made available to the central processing unit 30 by the audio input port 28 where it is processed as required and stored in the data storage memory 32 having typically a 36K word capacity storage capability. Serial data representing operator control functions are used to control the sequence of program steps by which the central processing unit 30 processes instructions.

The central processing unit 30 executes control functions in accordance with program instructions received from a programmable read only memory 36.

In normal operation of the voice processor, both a writing function for storing data into data storage memory 32 and a reading function responding to the stored data are carried out simultaneously by the central processing unit 30. Data read from the data storage 32 is processed through an audio output port 40 through the interface logic 34 and the serial interface 16 to a digital-to-analog converter 42. The data samples read from the data storage 32 are in a digital format and are processed in this format through the interface and converted into an analog voltage format in the digital-to-analog converter 42. The analog voltage is transferred through a low pass filter 44 and made available as audio signals to an operator.

While the samples of audio data from the tape transport 22 are converted and stored at a variable rate, the samples read from the data storage and converted into an analog format in the analog-to-digital converter 42 are processed at a fixed rate, typically 6 KHz.

Apparatus of the present invention, as illustrated in FIG. 1, replaces the analog tape loop system with a variable length digitally controlled memory loop basically requiring the data storage 32, the central processing unit 30 and the programmable read only memory 36. The size of the data storage 32 is determined by the product of the sample rate and the desired loop length. Operational studies for voice reduction applications have shown that a desirable loop length is represented by approximately 6 seconds of recording time. The central processing unit 30 controls both the read and write address locations and the memory address sequencing function required for processing data from the data storage 32 in a loop mode.

Figure 2:
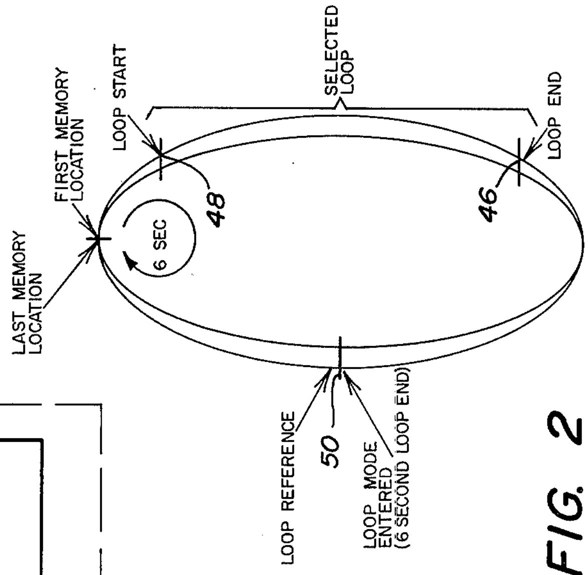
FIG. 2 is a simulated tape loop for illustrating the operation of the voice processor of FIG. 1.

Referring to FIG. 2, there is shown a simulated tape loop representing memory locations in the data storage 32 and is the equivalent of approximately 6 seconds of audio data inputed from the tape transport 22. In the normal mode of operation, audio data from the tape transport 22 is continually written into the data storage 32 with the newest sample from the tape deck written over the sample which was written into the data storage 32 6 seconds previously. The reference to the six second data storage is not critical to the operation of the system. The data storage 32 may be implemented with greater or less storage capability.

When the operator selects operation of the system in the loop mode, the address at which data is currently being written into the data storage 32 must be retained as the loop end 46. With reference to FIG. 2, another address location of the data storage 32 that is identified by the central processing unit 30 in the loop mode is the loop start 48. The selected loop, that is, the number of data samples between the loop start 48 and the loop end 46 is selectable by the operator and determines the amount of audio data read from the data storage 32 and processed to an operator through the digital-to-analog converter 42. Thus, the selected loop (memory storage locations) between the loop start 48 and the loop end 46 is variable and is computed by the central processing unit 30 from operator controlled data relative to the loop reference 50.

It should be noted, that when operating the system of FIG. 1 in the loop mode, audio data is inhibited from being inputed to the data storage 32 and only previously stored data is read out for processing to an operator. Since this previously recorded data remains in the data storage 32 until new data is input from the tape transport 22, when in the loop mode the stored data may be repeatedly read and reviewed by an operator.

Another mode of operation of the voice processor of the present invention is the variable speech rate (VSR) mode. In this mode, the voice processor can be operated at a reproduce/record speed other than unity. In this mode, data samples read from the data storage 32 are modified by the central processing unit 30 to compensate for the pitch (frequency) shift introduced into the voice signal. Such compensation is possible and can be accomplished because of the inherent redundancy of the information in the voice signal. That is, data samples in the storage 32 are redundant to produce a given voice signal.

In the variable speech rate mode audio data from the tape transport 22 is sampled at approximately the Nyquist rate which becomes variable as the reproduce-to-record speed ratio is varied by an operator control signal to the multiplexer 12. For reproduce/record speeds greater than unity, input data from the tape transport 22 will be stored at a rate higher than the desired rate of reading out data from the data storage and, therefore, some of the input data will be deleted. For reproduce/record speeds less than one, the input data rate will be less than the output data rate and, as a result, additional data must be used to fill in between data samples read from the storage memory 32. It has been found that the duration of redundant speech sounds is on the order of 100 milliseconds; thus the segments added or deleted have a smaller time span relative to this value.

In summary of operation of the system of FIG. 1 in the loop mode and the variable speech rate mode, in the loop mode input data is inhibited from being stored in the data storage 32. Data previously stored is repetitively read out by the central processing unit 30 for processing to the digital-to-analog converter 42. The read rate, that is, the rate at which data is processed from the data storage 32 to an operator is, as explained previously, at a fixed rate. In the variable speech rate mode, audio data is sampled and stored in the data storage 32. The rate at which the data is taken from the tape transport 22 may be varied in accordance with an operator control signal. Typically, samples of audio data are taken from the tape transport 22 and stored in the data storage 32 at a rate proportional to one-half the record speed to over two times the record speed. Again, as in the loop mode, data is read from the data storage 32 and processed by the central processing unit 30 at a fixed rate. This rate is established to insure normal voice to an operator.

Figure 3:
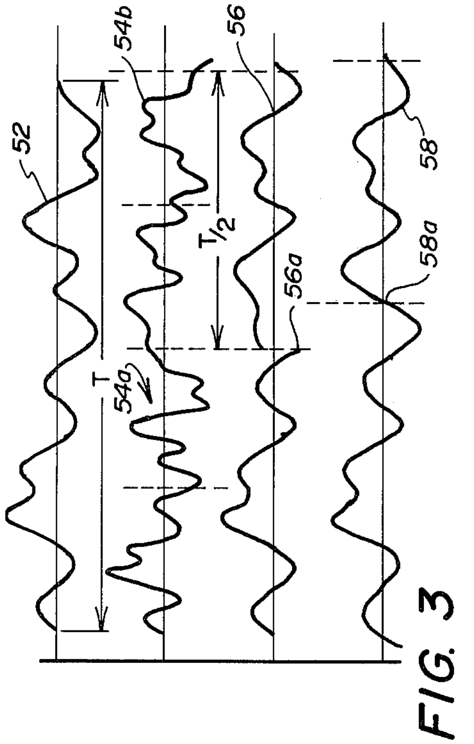
FIG. 3 is a series of waveforms illustrating pitch restoration when operating the system of FIG. 1 at reproduce/record speeds greater than one.

Referring to FIG. 3, when in the VSR mode at a reproduce/record rate greater than one, pitch restoration is accomplished by the central processing unit 30 by evaluation of the stored audio waveforms. Consider the segment of a voice signal of duration T as shown by the curve 52, if the reproduce/record rate is 2, the segments will be processed through the digital-to-analog converter 42 during playback in a time T/2. This is graphically shown by the curve 54. As a consequence, all frequency components present in the waveform 52 will be doubled. To restore the pitch (frequency) to normal values, as shown by curve 56, the signal 52 is segmented and half of the data samples 54a, 54b are deleted from the output samples. The retained data samples are expanded by two (the output data rate is one-half the input data rate) and, as a result, the original frequency components are restored. The deleted data samples must be few enough in number to avoid loss of the shortest speech sounds. Experimentation has shown that 10 to 20 milliseconds represents an optimum range for signal segmentation.

Referring then to curve 56, basic speech sounds have been restored, however, transients (distortions) at point 56a are introduced by the segmentation process. To minimize this distortion, the central processing unit 30 evaluates the amplitude of the read data samples and applies an amplitude threshold criterion to produce the voice segment of curve 58. The last data sample of the signal 52, prior to the deletion sequence, will be analyzed to insure that it is at an energy level low enough to minimize distortion. If the presently read data sample is not at a low enough value, the deletion of data will be delayed until a data sample is read having an energy level falling below the threshold value. Utilizing the thresholding technique rather than a uniform signal segmentation process based on time, the introduction of periodic components into the output spectrum, which results in undesirable audio characteristics, are minimized. Effectively, the energy level analyzation process produces a randomness which diminishes the distorting components from the output waveform. To further reduce transient distortion, a seven stage linear weighting function is applied by the central processing unit 30 to the data samples from the data storage 32 at the beginning of each outputed segment as shown in the curve 58 at the point 58*a*.

Figure 4:
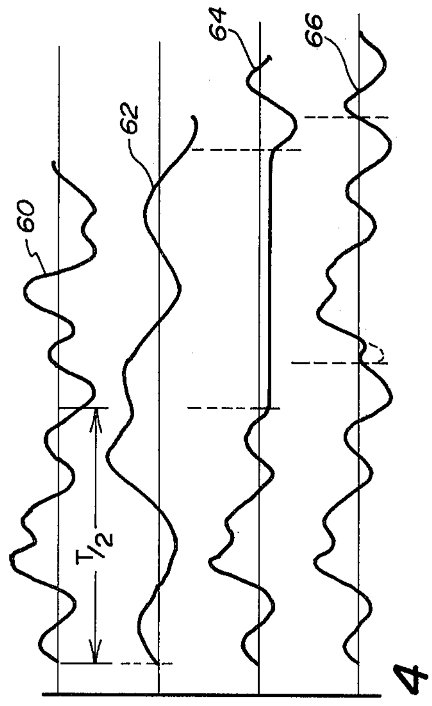
FIG. 4 is a series of waveforms showing pitch restoration for operation of the system of FIG. 1 at reproduce/record speeds less than one.

Referring to FIG. 4, when in the VSR mode and at a reproduce/record speed less than one, the central processing unit 30 processes the data signals from the storage memory 32 in accordance with the curves illustrated. Consider a segment of voice signal of duration T/2 as shown by the curve 60. When such a voice signal is processed at a reproduce/record speed of 0.5, it must be expanded in time by a factor of two as shown by the curve 62 and all frequency components are correspondingly halved. Normal pitch is restored to the audio data read from the storage memory 32 in the central processing unit 30 by segmenting and compressing the voice signal as shown on the curve 64. To restore the pitch of the audio data, the gaps (discontinuities) in the curve 64 are filled in with portions of the previous segment (redundant information having the same frequency content) as shown by the curve 66. Again, the energy threshold criterion and linear weighting functions are applied by the central processing unit 30 to the data read from the storage memory 32 to minimize discontinuities in the output waveform. An output waveform as generated by processing data from the storage 32 to the analog-to-digital converter 42 is shown by the curve 66.

To achieve the deletion of data in the VSR mode for reproduce/record speeds of greater than one, and the filling in of discontinuity for a reproduce/record speed of less than one, the address differential between the write pointer and the read pointer for the storage memory 32 is adjusted by the central processing unit 30. Initially, an address differential is established between data stored in the memory 32 and data read from the storage. For a reproduce/record speed greater than one this address differential decreases from the established initial value. When the address differential reduces to some preestablished minimum value, the read pointer is reset to the original address differential. This effectively deletes data by skipping stored samples in the storage 32. The deletion process is shown by the curve 54.

For a slow down operation when the reproduce/record speed is less than one, the original address differential increases and at a preestablished maximum differential, the read pointer is again adjusted with respect to the write pointer to the initial address differential. This has the effect of producing gaps in the processed data which must be filled in with redundant information as explained. Thus, the deletion process and the filling in process are achieved by maintaining the address differential between the read pointer and the write pointer through operation of the central processing unit 30.

As previously explained, the invention was implemented for two channel processing, that is, for the simultaneous processing of two voice signals. The block diagram of FIG. 1 illustrates one channel of the two channel implementation of the invention. In a two channel system, the central processing unit 30 and the programmable read only memory 36 are common to both channels.

Figure 5:
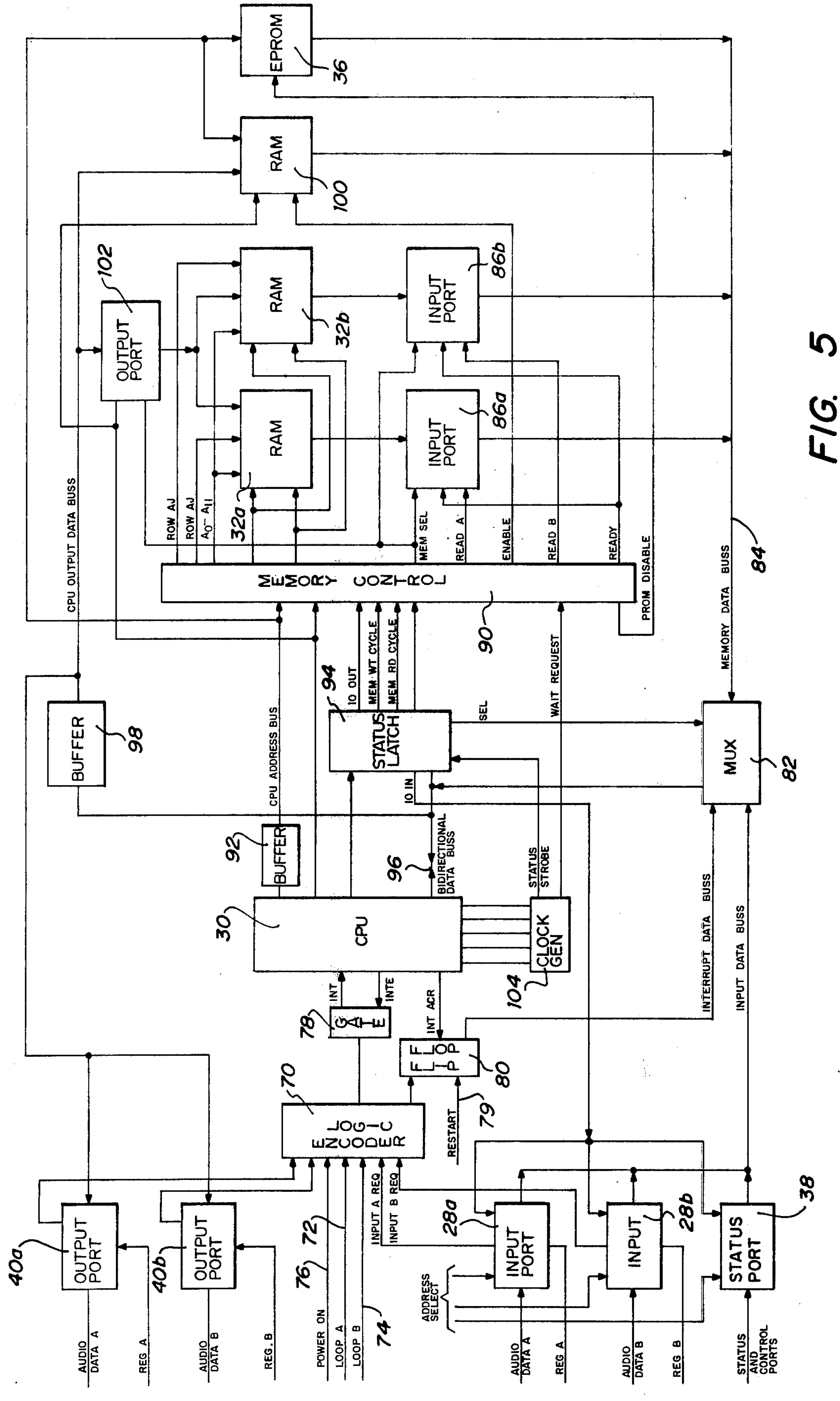
FIG. 5 is a block diagram of a two channel voice processing system having the central controller capacity to function with two voice processor channels as shown in FIG. 1.

Referring to FIG. 5, there is shown a block diagram of the voice processor 18 for a two channel voice processing system. The interface logic 34 of FIG. 1 is interconnected to the status port 38 and the audio output ports 40*a* and 40*b* with the output port 40*a* forming a part of one channel and the output port 40*b* forming a part of the second channel. Audio data from the channel analog-to-digital converter is applied to input ports 28*a* and 28*b*, respectively. Both the input ports 28*a* and 28*b* and the output ports 40*a* and 40*b* are interconnected to priority encoder logic 70.

Each of the input ports and the output ports generate interrupt commands to the priority encoder 70 and in addition the priority encoder receives loop mode interrupts on lines 72 and 74 and a power "on" interrupt on a line 76. A loop mode interrupt is generated when the system enters the loop mode and another loop mode interrupt is generated when the loop mode is terminated. Interrupt commands from the encoder 70 are coupled through a gate 78 to the central processing unit 30 and are also applied to a flip-flop 80 that receives a restart command on a line 79. A data interrupt generated by the flip-flop 80 is applied to a multiplexer 82 receiving input data from the input ports 28*a* and 28*b* and the status port 38. The multiplexer 82 provides digitized audio data and instructions on a buss 84 from input ports 86*a* and 86*b* and programmable read only memory 36. Connected to the input ports 86*a* and 86*b* are data storage memories 32*a* and 32*b*, respectively. The multiplexer 82 is a standard device well known in the art. Examples of various multiplexers may be found in the RCA Solid State Data Book Series, SSD-203A (1973 ed.) at pp. 379–390.

Data is transferred through the input ports 86*a* and 86*b* from the respective data memories 32*a* and 32*b* by commands from a memory controller 90. The memory controller 90, in turn, receives commands from the central processing unit 30. Address data is provided to the memory controller 90 from the central processing unit 30 through a buffer 92. Status commands to the memory controller 90 are provided from the central processing unit through a status latch 94. The status latch 94 also connects to the multiplexer 82. A bidirectional data buss 96 is also connected between the central processing unit 30, the status latch 94 and the multiplexer 82. In addition, the data buss 96 connects to a buffer 98 connected to the output ports 40*a* and 40*b*, and a random access memory 100. During a read cycle, data in the memories 32*a* and 32*b* is transmitted to the output ports 86*a* and 86*b*.

The entire microprocessor is controlled by a clock generator 104. Typically, the microcomputer consists of a 8080 central processing unit manufactured by Intel Corporation with the clock generator 104 and the status latch 94 as an integral part thereof. The central processing unit 30 is interfaced with the memory controller 90, the two data memories 32*a* and 32*b*, the random access memory 100, the read only memory 36, the priority encoder 70, the status port 38 and the two data input ports and the two data output ports. The encoder 70 and the memory controller 90 are standard devices used in conjunction with the standard 8080 CPU.

Audio data from the analog-to-digital converter 26 for each channel is read into the input ports 28*a* and 28*b*, respectively, with each such port generating an input interrupt request to the central processing unit 30 through the priority encoder 70. This interrupt request is serviced prior to the next data sample received from the analog-to-digital converter. The status port 38 is noninterrupting and provides the transfer of any operator panel control values, that is, tape speed, loop start, loop stop, and operating mode, to the central processing unit 30. The two independent output ports 40*a* and 40*b* are clocked at a regular frequency rate, for example 6 KHz, thus generating output interrupt requests to the central processing unit. In the operation of the central processing unit, an input interrupt request is given priority to insure maximum fidelity in the loop mode of operation.

Figure 6:
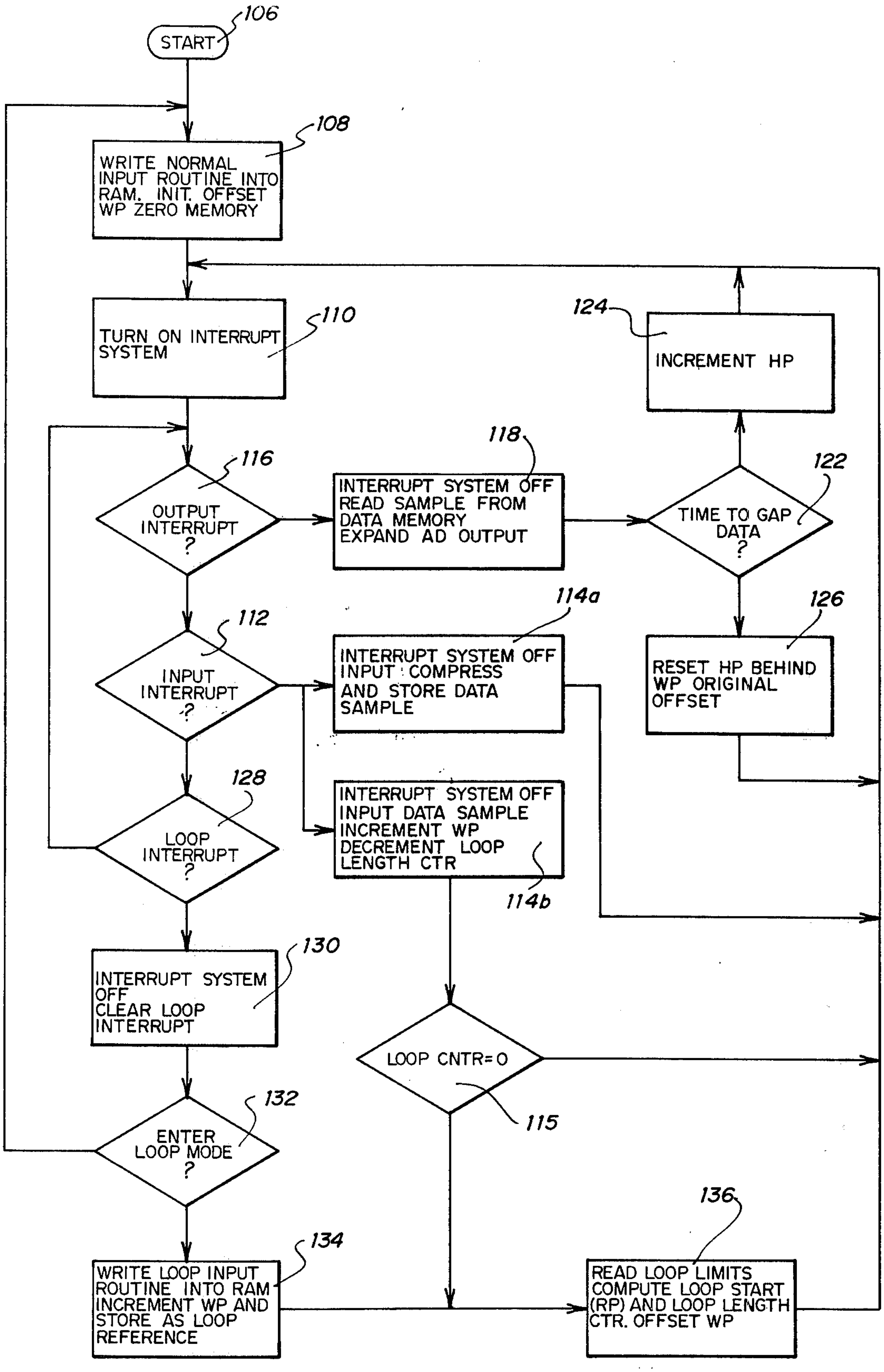
FIG. 6 is a generalized flow diagram for the microprocessor of FIG. 5 for single channel operation.

Referring to FIG. 6, there is shown a flow diagram of the operation of the voice processor 18 of FIG. 5 with a variable loop control. The process is initiated at a start step 106 which is followed by an initialization step 108 to zero the read pointer (RP) and offset the write pointer (WP) in addition to clearing the data storage 32. Selection of the reproduce/record speed establishes the relative position of the write and read pointers which, as explained, are used for memory address control. Following the setting of the read and write pointers in the step 108, the sequence advances to turn on the interrupt system including the priority encoder 70 in a turn-on interrupt 110.

With the system now initiated, the sequence advances to the output interrupt inquiry 116. If an output interrupt is available the sequence advances to an operation step 118 where the interrupt system is turned off, the output interrupt is cleared and a sample of data is read from the memory 32 and output to the digital-to-analog converter 42 for operator use.

Following completion of the operation 118, the sequence advances to the inquiry 122. During the inquiry 122 the system evaluates the address differential between the read pointer and the write pointer and if this differential is within the set limit the sequence advances to the operation step 124 to increment the read pointer and return the system to turn on the interrupt at 110. If the address differential has reached either the maximum or minimum established limits the inquiry 122 advances the sequence to the operation step 126 to reset a read pointer behind the write pointer at the original offset, and then return the system to the turn-on interrupt 110.

When no output interrupts are available, the sequence of FIG. 6 advances to an input interrupt inquiry 112 that advances the sequence to a subroutine 114*a* if the system is ready to transport audio input data into the data storage memory 32. Assuming an input interrupt has been generated and the system is in the normal mode, the central processing unit 30 advances the sequence to step 114*a* to turn off the interrupt system thereby clearing the input interrupt and commanding the multiplexer 82 to connect the input data buss to the central processing unit data buss. After the data sample is stored in the data memory 32, the write pointer is incremented.

Following completion of the step 114, the sequence returns to the interrupt 110 and the inquiry 112. Thus, any time an input interrupt is present and the system is in the normal mode the sequence cycles through the steps 110, the inquiry 112 and the operation step 114. As explained, an input interrupt request is given priority to minimize the probability of missing an input audio data sample.

Separate routines 114*a* and 114*b* are used for the normal and loop modes, respectively. In the normal mode, each time an input interrupt is serviced, as indicated by a positive response from the inquiry 112, an input data sample is transferred into the central processing unit 30, compressed, and the compressed values stored at the location identified by the write pointer. The write pointer is then incremented. When in the loop mode, the subroutine 114*b* is entered and written over the normal input service routine in the random access memory, and the loop reference is established by incrementing the present position of the write pointer. At the beginning of each cycle through the loop, the loop limits are transferred into the central processing unit 30 through input ports, a starting address for the loop is established (read pointer), the write pointer is offset, and a loop link counter is decremented. Following the decrementing of the loop link counter, the sequence advances to an inquiry 115 to check if the loop length counter has been reset to zero. If not, the system recycles to the turn-on interrupt step 110. When the loop counter has been decremented to zero, the sequence advances to an operation step 136.

When no output interrupt or input interrupt is available at the inquiries 116 and 112, the sequence advances to an inquiry 128 to evaluate if the priority encoder 70 has received a loop interrupt; that is, has an operator input been set to operate the system in the loop mode. If the system has not been set for the loop mode, the sequence returns to the inquiry 112 and cycles through the inquiries 112, 116 and 128 until one of the three interrupts occurs.

If the system is in the loop mode of operation, the inquiry 128 advances the sequence to an operation step 130 to turn off the interrupt system and clear the loop interrupt from the priority encoder 70. The processor then advances to the inquiry 132 and if the loop mode has not been entered then the sequence advances to the operation step 108.

With the system in the loop mode, following the inquiry 132 the operation step 134 is completed to set the start address, increment the read pointer, and store the address locations as a loop reference. Upon completion of the routine of the operation step 134 the sequence advances in operation step 136 to read the loop limits, compute and store the loop start and stop address, and set the read pointer equal to the loop start. The system is now in the loop mode of operation and returns through the turn-on interrupt 110 to the subroutine 114*b*.

In the loop mode of operation, input interrupts will not be accepted and the sequence advances to the inquiry 112 and through the operation step 114*b* to the inquiry 115 and subsequently to the subroutine 136. If the read pointer address is at the loop end, the sequence repeats through the operation step 136 to the turn-on interrupt 110. The processor continues to operate in the loop mode until an interrupt is received at the priority encoder 70 to terminate the loop mode of operation. The sequence then returns to cycling through the inquiries 112, 116 and 128.

Figure 7:
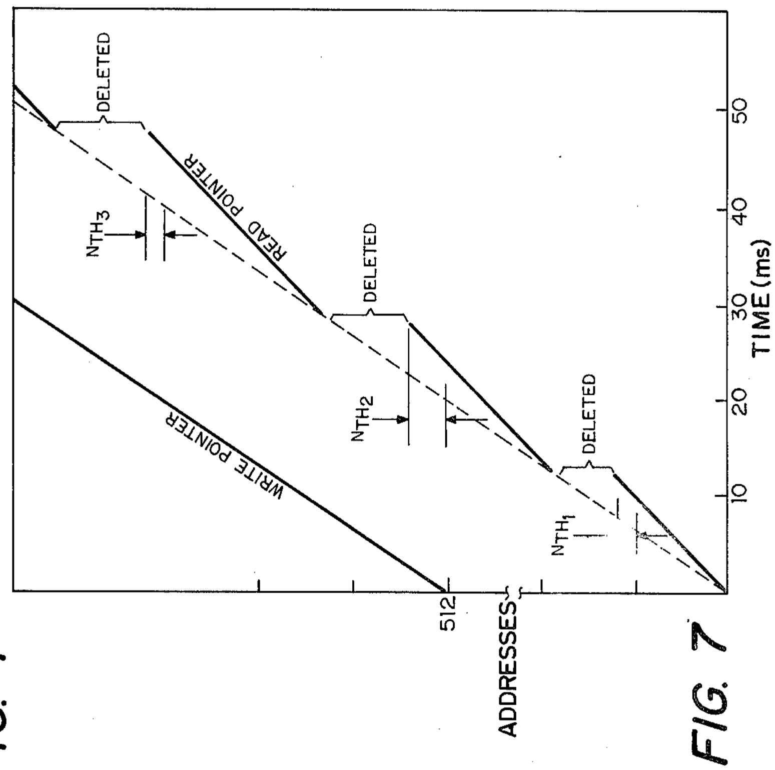
FIG. 7 is a plot of time in milliseconds versus address location illustrating a typical relative memory addressing operation for the voice processor of the present invention at a reproduce/record speed of 1.5.

Referring to FIG. 7, there is shown a plot of time in milliseconds versus address differential showing the relative addressing for a reproduction/record speed of 1.5. This graphically illustrates the operation of the processing unit during that part of the routine including the operation steps 124 and 126 and the inquiry 122. The values shown in FIG. 7 are representative only and various other address differentials and time increments may be selected.

Initially, with the system in the VSR mode the address differential between the read pointer and the write pointer is set at 512 data samples. In the speed up operation of the VSR mode, this differential continues to increase and after about 15 milliseconds the memory segment corresponding to the desired output segment is reached and the read pointer is reset behind the write pointer to the 512 data sample increment. For approximately the next 15 milliseconds the differential again increases until the read pointer is again reset behind the write pointer at approximately 30 milliseconds.

Note, that during each resetting of the read pointer behind the write pointer, the data samples are deleted from the output processing. However, the resetting of the read pointer behind the write pointer must also satisfy the thresholding criteria such that the differential between the pointers will continue to advance until the energy threshold criterion is satisfied. Only then will the read pointer be reset to the original offset relative to the write pointer. The additional number of samples which the read pointer advances after reaching the selected differential to satisfy the energy threshold for the $i_{th}$ signal segment is denoted by $N_{th_i}$.

This technique causes data to be skipped for the speed up operation and repeated for the slow down operation. The compensation rate and period is automatically varied, and the average pitch is restored with the mode of operation (speed up or slow down) being transparent to the microprocessor. Note, that the output signal segments and the corresponding amount of signal deleted (speed up) and redundant signal added (slow down) are varied in length by the signal segmentation technique thereby significantly reducing periodic distortion components from variable speech rate processing.

Figure 8:
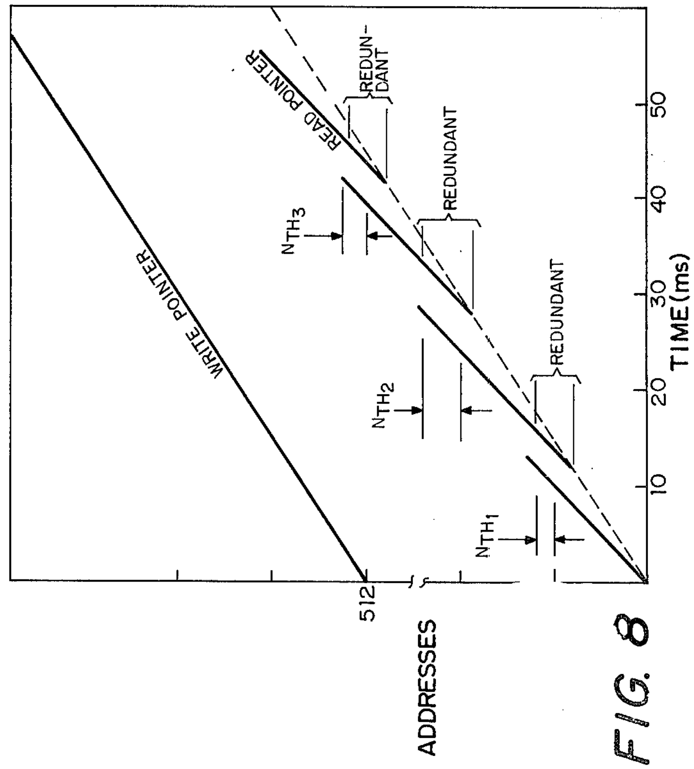
FIG. 8 is a plot of time in milliseconds versus address location illustrating a typical relative memory addressing operation for the voice processor for slow down operation (reproduce/record speed = 0.67)

Referring to FIG. 8, there is shown a plot of time in milliseconds versus address differential between the read pointer and the write pointer for a reproduce/-record speed of 0.67. This is the slow down operation where the data is input into the data storage memory 32 at a faster rate than it is output through the digital-to-analog converter 42. During the slow down operation, the memory address differential between the read pointer and the write pointer continually decreases until the memory segment corresponding to the desired output segment is reached at which time the read pointer is reset behind the write pointer to the original address differential of 512 data samples. When resetting the read pointer relative to the write pointer, some of the data samples previously output through the digital-to-analog converter 42 will be repeated giving a redundant operation. The differential between the two pointers again continually decreases until the desired minimum output segment is reached at which time the read pointer is again reset behind the write pointer to the original offset. This continues in a manner similar to that described with regard to FIG. 7.

Figure 9:
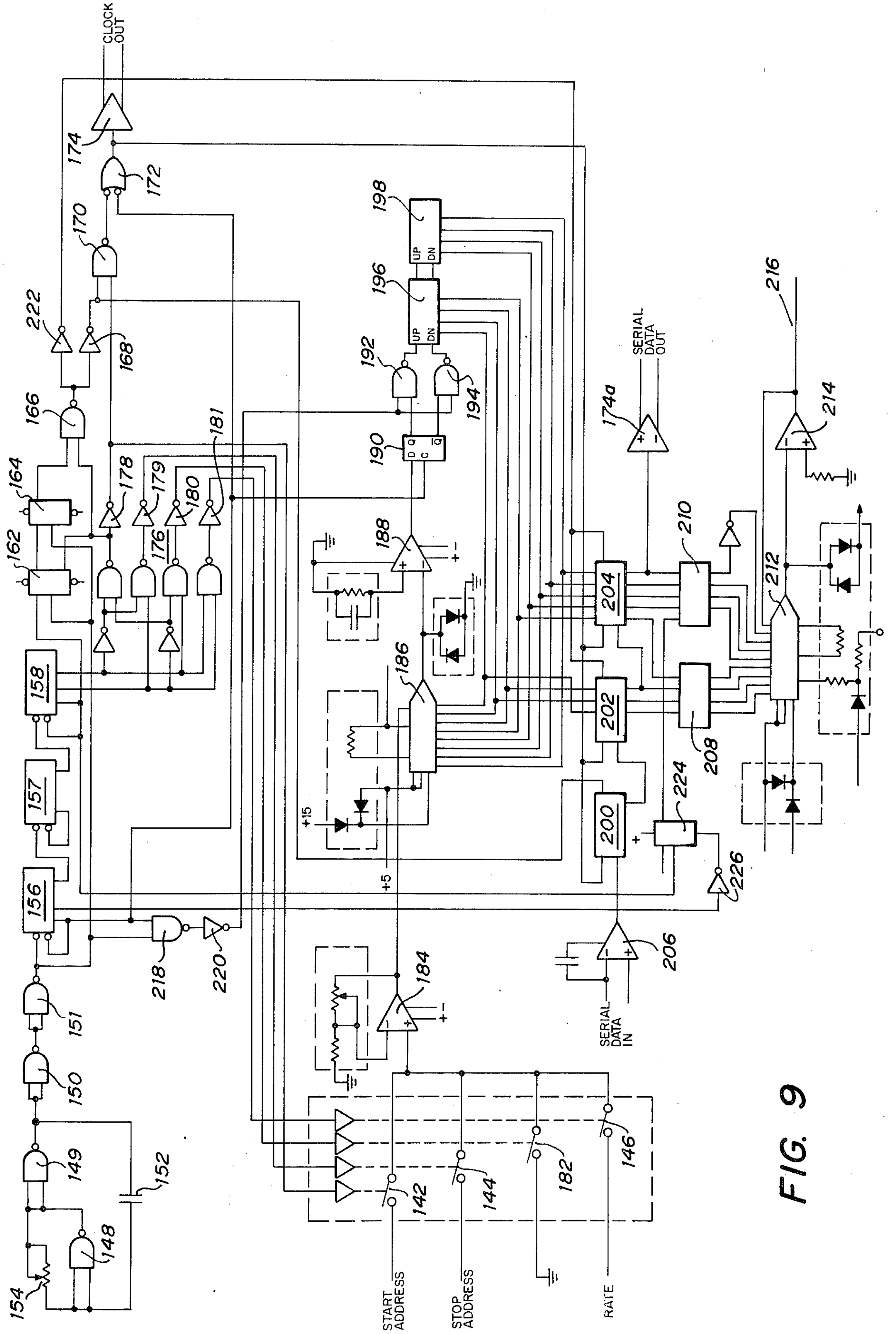
FIG. 9 is a detailed logic diagram for the control panel electronics of the single channel of FIG. 1.

Referring to FIG. 9, there is shown a logic diagram for the operator control panel 10 including necessary logic to sample the start and stop limit switches 142 and 144 and the speech rate control switch 146 as well as the controls for selecting the loop mode and the VSR mode. Also shown in FIG. 9 is logic for transferring this information into a digital format through the serial interface 16 to the remote processor 18.

Included as part of the logic is the primary clock oscillator comprising NAND gates 148–151 and an associated timing capacitor 152 and an adjustable potentiometer 154 to generate the basic clock frequency, typically 3.07 MHz. This clock frequency is divided down by counters 156–158 to produce the basic audio sample clock frequency on line 160 from the divider 158. As explained previously, the basic clock frequency in a system implemented to incorporate the present invention is 6 KHz. This clock frequency is output through flip-flops 162 and 164, a NAND gate 166, an inverter amplifier 168, a NAND gate 170, a NOR gate 172 and a line driver 174. The clock output from the driver 174 is provided to the remote processor 18.

In addition to producing the basic clock frequency at the counter 158, output lines therefrom are connected to logic 176 producing at the output of inverter amplifiers 178–181 four separate time frames during which operator controls are sampled. That is, during one time frame the start address switch 142 is sampled, during the next time frame the stop address switch 144 is sampled, the spare position switch 182 is sampled during a third time frame and the speech rate switch 146 is sampled during the fourth time frame. This sampling is continuously repeated in accordance with the clock frequency. The logic 176 and the switches 142, 144, 146 and 182 comprise the multiplexer 12 of FIG. 1.

Analog signals representing operator commands are converted into a digital format by circuitry including an amplifier 184 connected to a converter 186 in turn driving an operational amplifier 188 having an output coupled through a flip-flop 190 and NAND gates 192 and 194 to up/down counters 196 and 198. This logic comprises a tracking analog-to-digital converter and the digital outputs from the converter 186 and the up/down counters 196 and 198 are strobed at the proper time into shift registers 200, 202 and 204. Thus, the circuitry including the converter 186 and the up/down counters 196 and 198 comprises the analog-to-digital converter 14 of FIG. 1.

Digitized data then strobed into the registers 200, 202 and 204 is shifted out as serial data through a line driver **174*a* comprising a second part of the line driver 174. The registers 200, 202 and 204 and the line driver 174*a* comprise a part of the serial interface 16** of FIG. 1.

Data samples in serial format read from the data storage memory 32 are applied to the logic of FIG. 9 through an amplifier 206 to the registers 200, 202 and 204. At the proper clocking time, the serial data read into the registers 200, 202 and 204 is strobed into holding registers 208 and 210 having outputs which are applied to a digital-to-analog converter comprising a converter 212 and an amplifier 214. Holding registers 208 and 210 are also a part of the serial interface 16. At the output of the amplifier 214 there is generated audio data that is applied to the filter 44 for operator utilization.

Each operation of the circuit of FIG. 9 is synchronized by the clock oscillator with the analog-to-digital converter including the up/down counters 196 and 198 strobed by means of the NAND gates 192 and 194 from a NAND gate 218 driving an inverter amplifier 220. This clock frequency is also sent to the remote processor via NOR gate 172 and driver 174. The registers 200, 202 and 204 are strobed by the output of the NAND gate 166 through an inverter amplifier 222 and the output of the inverter amplifier 168 is connected to the register 200. The holding registers 208 and 210 are strobed by the output of a flip-flop 224 at the clock rate frequency on the line 160. This flip-flop is reset through an inverter amplifier 226 connected to the counter 156.

Figure 10:
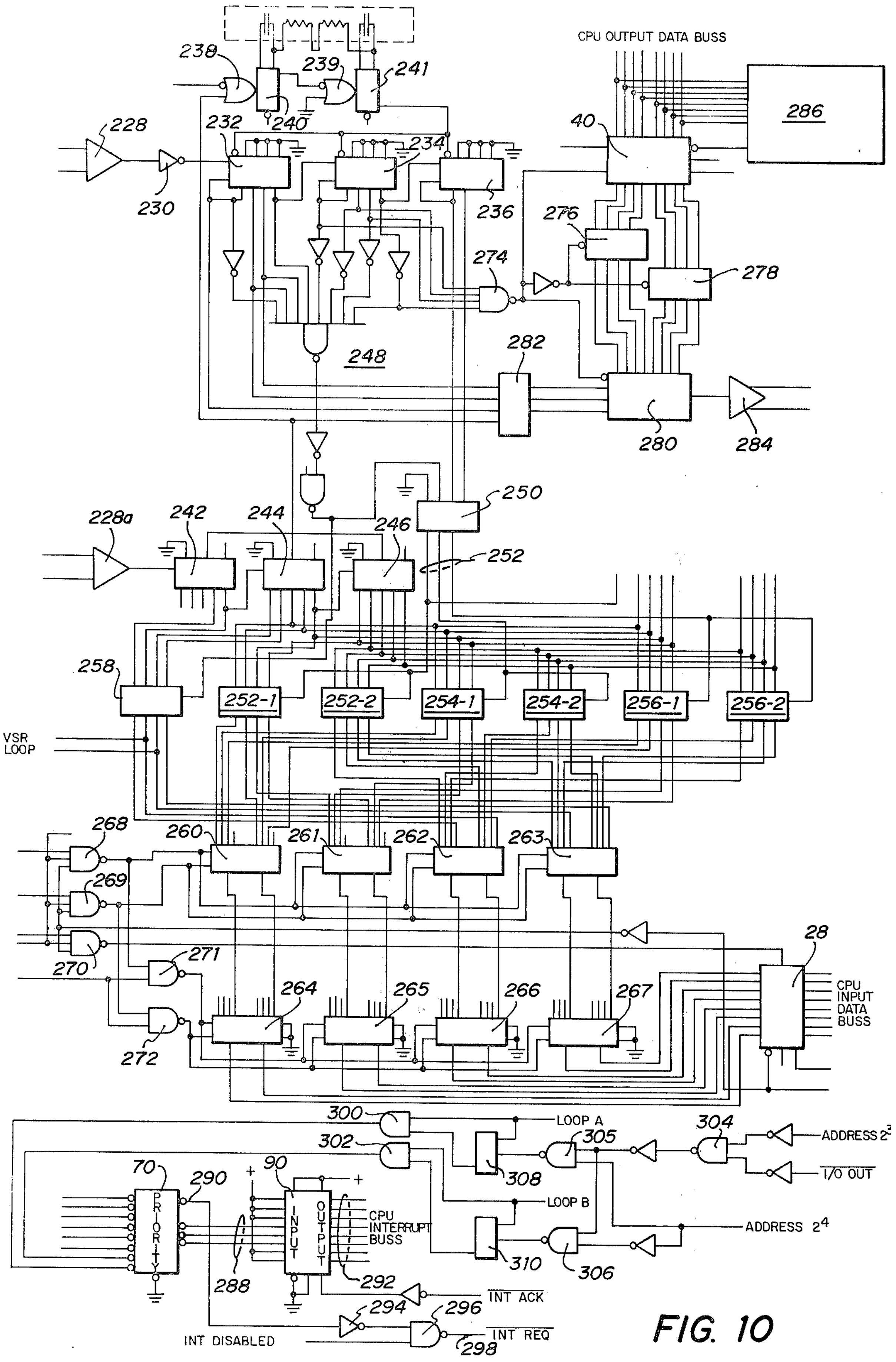
FIG. 10 is a logic diagram illustrating circuitry for receiving voice input data for processing to data storage and for retrieving from data storage for processing to output circuitry.

Referring to FIG. 10, there is shown a logic diagram of the interface 34 of the remote processor 18 that receives the serial data from the driver **174*a* and the associated multiplexing clock frequency from the driver 174 for driving the central processing unit 30 through the input/output ports. The clock frequency from the driver 174 is applied to the logic of FIG. 10 at a line receiver 228 and coupled through an inverter amplifier 230 into counters 232, 234 and 236. These counters are synchronized by means of a one shot timing network including OR gates 238 and 239 and monostable multivibrators 240 and 241 with the output of the latter one shot multivibrator coupled to one terminal of each of the counters 232, 234 and 236**.

Serial data from the driver **174*a* is applied to a line receiver 228*a* forming a second part of a receiver circuit with the line receiver 228. Data input to the line receiver 228*a* is shifted into registers 242, 244 and 246 at the clock rate applied to the line receiver 228**.

Clocking signals from the counters 232, 234 and 236 are decoded in logic 248 including a decoder 250 supplying sampling clock pulses on the lines 252.

Serial input data to the registers 242, 244 and 246 is sampled and input into registers 252-1, 252-2, 254-1, 254-2, and 256-1 and 256-2. The six registers illustrated are interconnected in pairs to form three register units. These registers always contain the latest value of the start/stop operator inputs as well as the processing rate. Also included in this array of registers is a register 258 which contains sampled discrete information of operator inputs.

Information in the registers 252, 254, 256 and 258 is available for shifting into a dual level multiplexer comprising registers 260–263 at a first level and registers 264–267 at a second level. In operation of the multiplexer, any of the data in the registers 252–256 will be transferred into registers 260–267 and converted into an eight bit code that feeds into the audio input port 28 which is shown in FIG. 10 as a register 28 having output lines connected to the central processing unit input data buss. Data in the registers 252–256 is selected by a gating network comprising NAND gates 268–272 coupled directly from the central processing unit 30.

The input shift clock from the logic 248 is also decoded by a NAND gate 274 and controls the strobing of the audio data from the central processing unit during a read frame through the registers 276 and 278. Sample data processed by the CPU from the data storage memory 32 is coupled through the registers 276 and 278 to the output port 40. Data that is strobed into the registers 276 and 278 is clocked out onto the serial data lines through a register 280 clocked by means of clock pulses from a register 282. Audio data samples read from the data storage memory 32*a* and processed by the CPU are clocked through the register 280 are coupled through a line driver 284 to the line receiver 206 of FIG. 9.

As mentioned earlier, the remote processor 18 was implemented for a dual channel system. The second channel is similar to the logic described immediately above and to avoid excessive repetition is illustrated in FIG. 10 by the block 286. Output lines from the logic within the block 286 comparing to the registers 252, 254, 256 and 258 are coupled to the multiplexer registers 260–267 at the open input lines illustrated. Thus, the multiplexer logic of registers 260–267 and the NAND gates 268–272 are not included within the blocks 286 but rather function to couple data from both channels to the input port 28.

Also shown in FIG. 10 is interrupt logic for the central processing unit consisting of the priority encoder 70 having eight inputs with the highest priority line at any time interval appearing on one of the output lines 288. A binary code on any of the lines 288 drives a signal on a line 290 "low" which generates an interrupt to the central processing unit 30 and the code of the highest priority line to the encoder 70 will be an interrupt which is passed through the register 90 to generate identifying instructions to the central processing unit 30 on one of the interrupt lines 292. When the line 290 goes "low" the signal is applied through an inverter amplifier 294 to a NAND gate 296 also receiving an interrupt disable signal and producing an interrupt required signal on a line 298.

The logic of FIG. 10 provides the interrupts for transitions to advance from the loop mode for both channels of the system of FIG. 5 with the restart interrupt for channel A generated at a NAND gate 300 and a restart interrupt for channel B generated at a NAND gate 302. Also included as part of the restart logic are NAND gates 304–306 and flip-flops 308 and 310.

Figure 11:
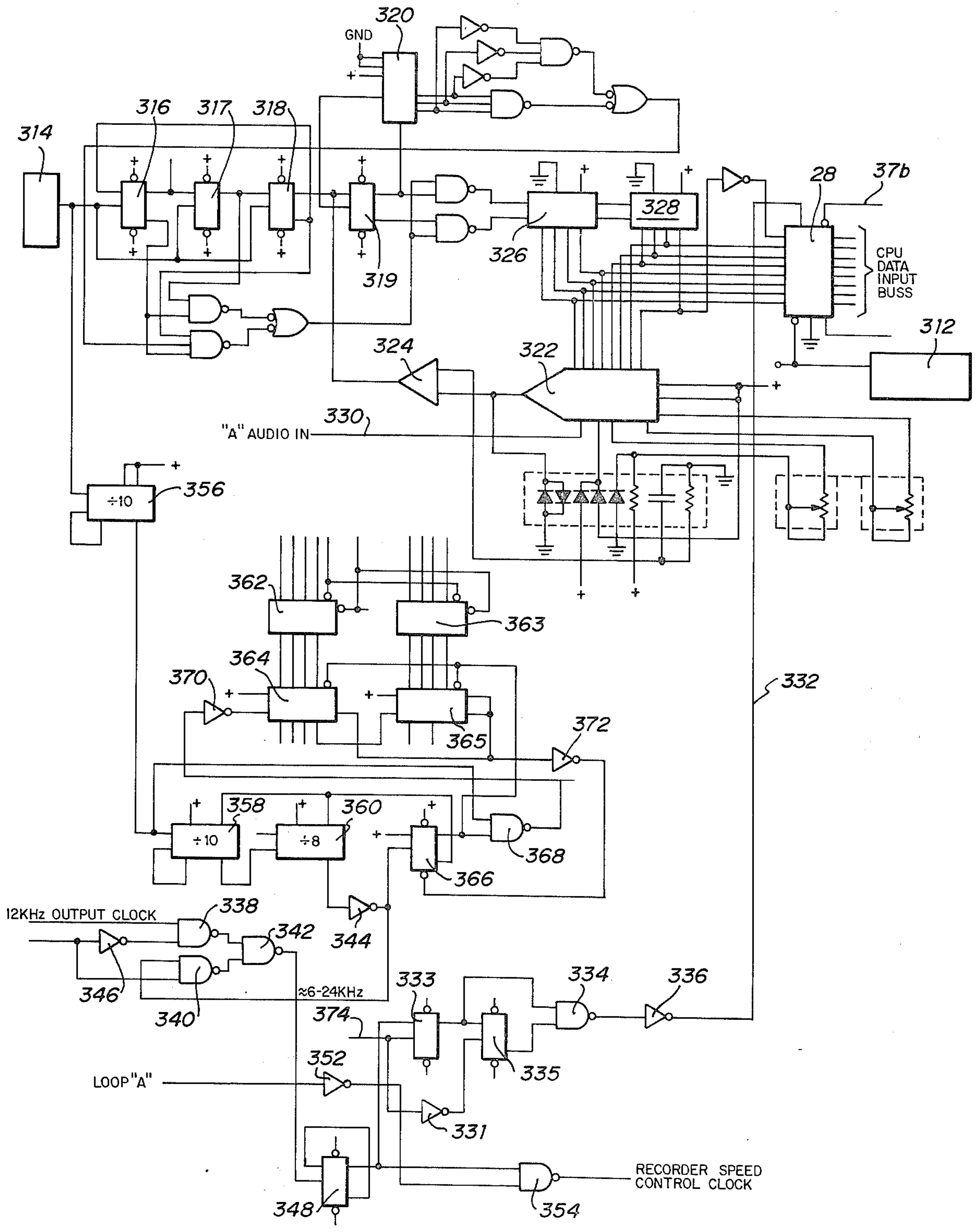
FIG. 11 is a logic diagram of circuitry for generating a reference clock as well as recorder and speed control clocks to be proportional to the audio sample rate.

Referring to FIG. 11, there is shown a logic diagram for generating the VSR mode reference clock as well as the rate clock to the filter 24 and the analog-to-digital converter 26 which is proportional to the audio sample rate. Also included in FIG. 11 is the input for the analog-to-digital converter 26 which converts the audio input data into digital data for the central processing unit 30 for storage in the data storage memory 32. Again, FIG. 11 comprises a logic for a two channel system with the logic for the second channel similar to that shown, and to avoid duplication of the description is illustrated by a block 312. Thus, logic within the block 312 is similar to that detailed in FIG. 11.

The basic clock frequency is derived from an oscillator 314, and this frequency is divided down by flip-flops 316–320 with the output of the flip-flop 320 generating the basic clock rate used for the tracking analog-to-digital converter 26.

The analog-to-digital converter includes a converter 322, an inverter amplifier 324 and up/down counters 326 and 328. Audio data from the tape transport 22 is input to the converter 322 over a line 330. Analog data input on the line 330 after conversion into a digital format is processed to the central processing unit 30 through the audio input port 28.

As configured, the analog-to-digital converter runs continuously at a high sample rate inputing data in a digital format to the audio input port 28. The audio input port 28 comprises a register that is strobed by a signal on a line 332. Strobe signals to sample the date in the input port 28 are generated at the output of a NAND gate 334 through an inverter amplifier 336.

To strobe the data in the audio input port 28 into the central processing unit, an input interrupt is applied to the input port on a line 376.

The clock frequency from the line driver 174 of FIG. 9 is input to the logic for generating the strobe pulses at a NAND gate 338 having an output coupled to a NAND gate 342. Also coupled to the input of a NAND gate 342 is a NAND gate 340 receiving clock pulses generated at the output of an inverter amplifier 344.

Clock pulses generated at the output of the inverter amplifier 344 are mixed in the NAND gate 342 and produce the variable recorder speed control through the inverter amplifier 350. These clock pulses are also applied to a flip-flop 333 as part of a synchronizing circuit including a flip-flop 335 both having outputs interconnected to the NAND gate 334. The flip-flops 333 and 335 are cleared by a signal on the line 374 that is directly coupled to the flip-flop 333 and coupled through an inverter amplifier 331 to the flip-flop 335.

When in the VSR mode, a signal applied to the input of the NAND gate 340 and to the input of the NAND gate 338 through an inverter amplifier 346 selects either the clock frequency from the driver 174 or the clock at the output of the inverter amplifier 344 for coupling through the NAND gate 342 into a flip-flop 348. The flip-flop 348 divides the clock frequencies by two, so as to provide a square wave recorder speed control clock. The selected frequency at the output of flip-flop 348 is the same as the audio sample rate.

When in the loop mode, the operator control data is applied through an inverter amplifier 352 to the input of a NAND gate 354 which functions to shut down the tape transport 22.

In the VSR mode, the clock frequency as derived from the oscillator 314 is coupled through a register 356 to registers 358 and 360. Also forming part of the clocking logic for generating the clock pulses in the VSR mode are counters 362–365. The output of the inverter amplifier 344 is coupled to a flip-flop 366 driving a NAND gate 368 coupled through an inverter amplifier 370 to the counter 364. An output of the counter 364 and the counter 365 are coupled through an inverter amplifier 372 to the reset terminal of the flip-flop 366.

Figure 12:
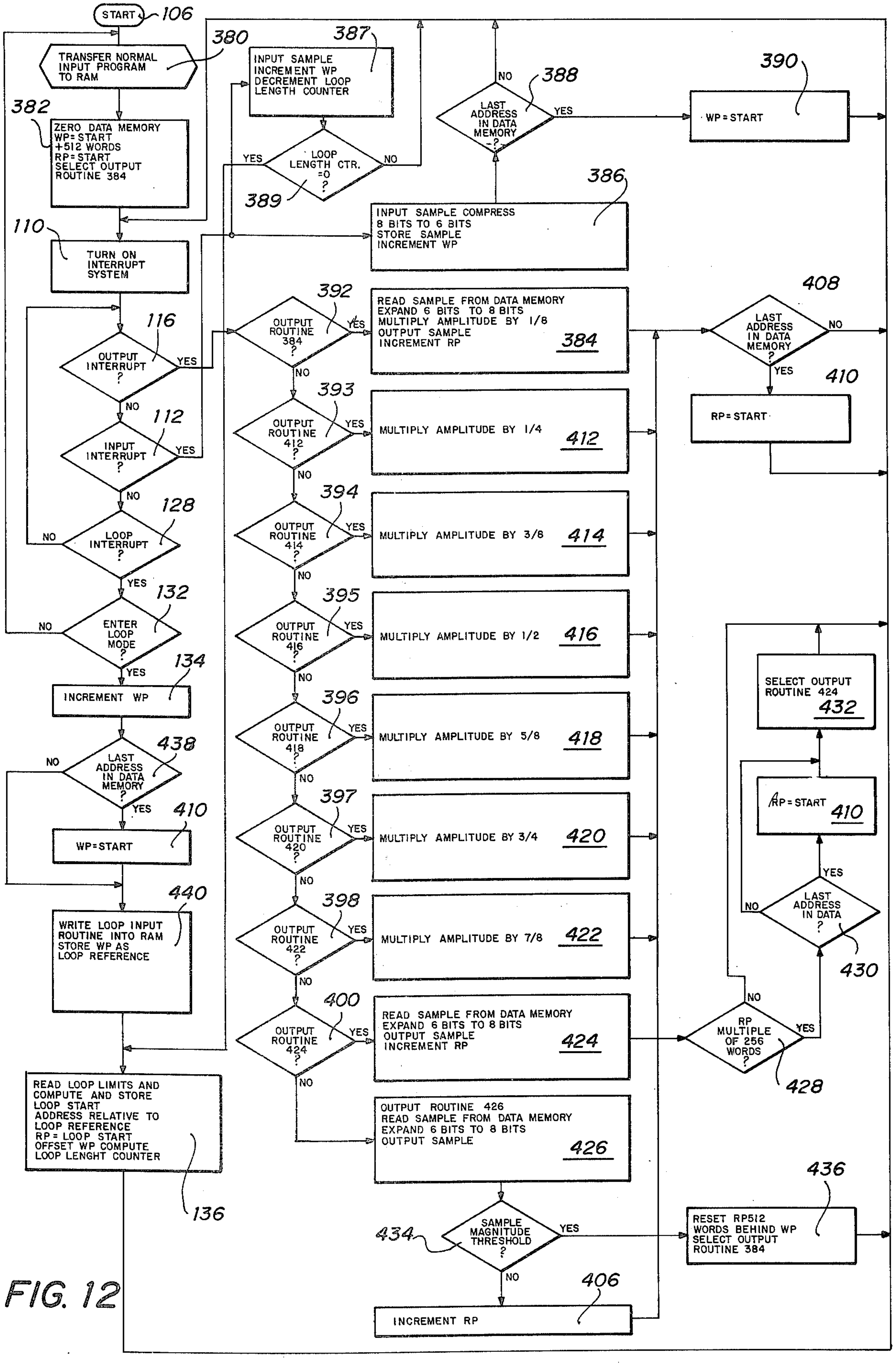
FIG. 12 is a detail flow diagram showing the operation of the system of FIG. 1 as implemented by the logic of FIGS. 9–11.

Referring to FIG. 12, there is shown a detailed flow diagram of the operation of the central processing unit 30 for the system detailed in FIGS. 9–11. The flow diagram of FIG. 12 is an expansion and more detailed than the generalized flow diagram of FIG. 6.

The main routine starts at a step 106 and advances to an operation step 380 wherein the input program (for normal mode) is transferred from the programmable read only memory 36 to the central processing unit 30. With the transfer of the input program to the central processing unit, the sequence advances to an operation step 382 where the read pointer is set at a start address and the write pointer is set at a start address which may be typically 512 data samples from the read pointer. An output routine 384 is selected (when in an output mode) and the sequence advances to the turn on interrupt step 110, as in FIG. 6, and then advances through the inquiry 116 to the inquiry 112 (when in an input mode) which advances the sequence to an operation step 386 when an input interrupt has been generated.

The input sample from the analog-to-digital converter 26 is compressed from eight bits to six bits during the operation step 386 and these six bits are transferred through the central processing unit to the data storage 32. Also, the write pointer is incremented one memory location.

If additional address locations are available in the storage memory 32, the sequence advances through an inquiry 388 to the turn on interrupt step 110. If the last address in the data storage memory 32 has been filled by the last operation of the step 386 the sequence advances to an operation step 390 wherein the write pointer is reset to a start position and the sequence returns to the turn on interrupt step 110.

When in the loop mode, from the inquiry 112 the sequence advances to the subroutine 387, which was described previously in detail as the subroutine **114*b* of FIG. 6. Following the subroutine 387, the sequence advances to the inquiry 389 to either the step 136 or the turn on interrupt 110**.

Continuing with the flow diagram, when an output input interrupt is available the sequence advances to the inquiry 116 and then advances to an inquiry 392. Inquiry 392 is one of a series of inquiries extending through inquiry 400. During an output interrupt when a sample is retrieved from the storage 32 for processing through the digital-to-analog converter 42, the inquiries 392–400 are sequentially made to determine the routine followed for a particular data sample.

With reference to FIGS. 7 and 8, for all data samples where the address differential between the write pointer and the read pointer is within the established limits, the inquiries 392–399 are sequentially sampled and the routine advances to an output routine 426. This is the normal operation of the output sampling and in the routine 426 a sample read from the data storage 32 is expanded from six bits to eight bits and output to the digital-to-analog converter 42.

Again with reference to FIGS. 7 and 8, whenever the address differential between the read pointer and the write pointer reaches its established limits the read pointer is incremented to either delete data as described earlier with reference to FIG. 7 or repeat data as described with reference to FIG. 8. In either situation, however, the next data sample read from the storage 32 is not immediately output to the digital-to-analog converter 42. Rather, a weighting routine is completed for each of the next eight samples.

For the first sample after the resetting of a read pointer, the inquiry 392 advances the routine to the output routine 384. In the output routine 384, the sample read from the data storage 32 is expanded from six bits to eight bits and multiplied by an amplitude factor of $\frac{1}{8}$. This weighted data sample is then output to the digital-to-analog converter 42 and the read pointer is incremented. Also, at this time the sequence is advanced to an output routine 412. However, this routine is not entered until the sequence advances through the inquiry 408 and back through the inquiry 116 and the inquiry 392 to the inquiry 393. At this time the sequence advances to the output routine 412 which is identical to the output routine 384 with the exception that the expanded data sample is multiplied by a weighting factor of $\frac{1}{4}$ and the central processing unit 30 is advanced to an output routine 414.

For the third data sample following the resetting of the read pointer, the output routine 414 is run, the retrieved data sample is multiplied by a factor of $\frac{3}{8}$ and the system advances to an output routine 416. For the fourth data sample retrieved after resetting the read pointer the output routine 416 is completed and the fifth through eighth data samples the system sequences through the output routines 418, 420 and 422 wherein the data sample is multiplied by the factor shown. Thus, for the first eight samples after resetting the read pointer a weighting factor is applied to the retrieved data samples. This improves the quality of the reproduced sound by eliminating sharp change-overs in amplitude that would otherwise result from the resetting of the read pointer. For the ninth data sample the inquiry 399 advances the sequence to the routine 424 wherein the data sample is expanded from six bits to eight bits and output at its read value to the digital-to-analog converter 42. The read pointer is again incremented.

Upon completion of the output routine 424 instead of advancing to the inquiry 408, the sequence advances to an inquiry 428 wherein the differential between the read pointer and the write pointer is evaluated. If there are less than 256 data samples between the read pointer and the write pointer, as a typical example, the sequence advances from the step 428 to the interrupt step 110. When the address differential between the read pointer and the write pointer is greater than the preestablished limit, the inquiry 428 advances the routine to the inquiry 430 and if the last data sample retrieved from the storage 32 is at the last memory address, the sequence advances to the operation step 410 to reset the read pointer to a start position. When additional data samples are in the storage memory 32 at the inquiry 430 or upon completion of the operation step 410, the sequence advances to an operation step 432 to set the sequence to return to the output routine 424 for the next data sample.

In addition to weighting data samples after resetting the read pointer the sequence also evaluates the data samples prior to resetting the pointers for a threshold level. That is, the read pointer will not be reset with respect to the write pointer if the last data sample from the data storage 32 is above a threshold level. This sequence is completed by advancing from the inquiry 399 to the output routine 426. The data sample read from the storage memory 38 is expanded from six bits to eight bits and the sample output to the digital-to-analog converter 42.

At this time the magnitude of the output sample is evaluated in a threshold routine and if this sample is above an established threshold the read pointer is incremented in the step 406 and the sequence returns through the inquiry 408 to the interrupt 110. If the address differential has been exceeded and the last data sample is below the established threshold the inquiry 434 advances the sequence to an operation step 436 where the read pointer is again reset with respect to the write pointer to the selected differential. Following completion of the output routine 436 the system is reset to complete the output routine 384 when the write pointer and read pointer differential again reaches the established limits.

As explained previously with respect to FIG. 6, the central processing unit checks for the loop interrupt in an inquiry 128 and enters the loop mode in inquiry 132 followed by an operation step 134 to increment the read pointer. In the loop mode and following the incrementing of the read pointer in the step 134 the sequence advances to an inquiry 438 and if the last data sample was at the last address location in the data storage 32 the sequence advances to the step 410 to reset the read pointer to the start position.

When additional data samples remain in the storage 32, inquiry 438 advances the routine to an operation step 440 wherein the loop input routine is written into the random access memory and the write pointer is stored as a loop reference. At the completion of the step 440 the sequence advances to the operation step 136 as described previously with reference to FIG. 6. The step 136 is also entered from the inquiry 389 when the loop length counter is reset to zero.

TABLE I

```
                                 ;SINGLE CHANNEL MODE(8-26-75)
                                 ;SAMPLE WIDTH=10-20 MS.
                                 ;VSR LOOP
0000                  ORG  00H
0000 C34000           JMP  START
0003                  ORG  8H
0008 DB08             IN   IPA          ;INPUT CHANNEL A
000A 2601             MVI  H,01H        ;COMPRESSION
000C 6F               MOV  L,A
000D 7E               MOV  A,M
000E 02               STAX B            ;STORE ACC. IN MEMORY
000F 0C               INR  C            ;INCREMENT WRITE PTR.
0010 C0               RNZ
0011 04               INR  B
0012 C0               RNZ
0013 0670             MVI  B,HO2BK      ;RESET WRITE PTR.
0015 C9               RET
0016 0C               INR  C            ;LAST PART OF VSR LOOP SUB.
0017 C0               RNZ
0018 04               INR  B
0019 C0               RNZ
001A 0670             MVI  B,HO2BK
001C C9               RET
001D                  ORG  28H
0028 C30033           JMP  OUT1
002B          LPFL:   DS   1H           ;LOOP FLAG
002C          LREFH:  DS   1H           ;HO LOOP REFERENCE
002D          LREFL:  DS   1H           ;LO LOOP REFERENCE
002E          CTRH:   DS   1H           ;HO CNTR.
002F          CTRL:   DS   1H           ;LO CNTR.
0030          ADOUT:  DS   1H
0031                  ORG  38H
0038 C34003           JMP  LPAA
003B                  ORG  40H
0040 1A       OUTTH:  LDAX D
0041 2600             MVI  H,00H
0043 6F               MOV  L,A
0044 7E               MOV  A,M
0045 D302             OUT  OPA
0047 C60A     PSLCK:  ADI  0AH          ;COMPARE OUTPUT WITH -10D
0049 F25300           JP   THCK         ;THCK IF >-10D
004C 1C               INR  E
004D C0               RNZ
004E 14               INR  D
004F C0               RNZ
0050 1670             MVI  D,HO2BK
0052 C9               RET
0053 D614     THCK:   SUI  14H          ;COMPARE OUTPUT WITH +10D
0055 FA5F00           JM   PASS         ;PASS IF <+10
0058 1C               INR  E
0059 C0               RNZ
005A 14               INR  D
005B C0               RNZ
005C 1670             MVI  D,HO2BK
005E C9               RET
```

```
005F 2100FE    RATE:  LXI  H,-512   ;H,L = -512D
0062 19               DAD  D        ;H,L=WRITE PTR.-512
0063 AF               XRA  A
0064 84               ADD  H
0065 FA6E00           JM   REPL     ;REPL IF (WR. PTR.-512)<0
0068 D670             SUI  H028K
006A F26E00           JP   REPL     ;REPL IF (WR. PTR.-512)>28K
006D 67               MOV  H,A      ;H,L=WR. PTR.-512-28K
006E EB        REPL:  XCHG          ;D,E=H,L
006F 210003    RSET:  LXI  H,OUT1
0072 220400           SHLD 04H
0075 213000           LXI  H,30H
0078 3E07             MVI  A,7H
007A 83               ADD  E
007B F28600           JP   PLUS
007E C640             ADI  40H
0080 F29100           JP   MIN4
0083 3663             MVI  M,OUTA3 AND 0FFH
0085 C9               RET
0086 D640      PLUS:  SUI  40H
0088 F28E00           JP   PLUS2
008B 3636             MVI  M,OUTA1 AND 0FFH
008D C9               RET
008E 3646      PLUS2: MVI  M,OUTA2 AND 0FFH
0090 C9               RET
0091 367E      MIN4:  MVI  M,OUTA4 AND 0FFH
0093 C9               RET
0094 212300    LRAA:  LXI  H,LPFL   ;H,L=LOOP FLAG ADDRESS
0097 D310             OUT  OPCLA
0099 7E               MOV  A,M
009A C680             ADI  80H      ;COMPLEMENT LOOP FLAG MSB
009C 77               MOV  M,A
009D CA5902           JZ   INITA    ;INITA IF LOOP FLAG=0
00A0 0C               INR  C
00A1 C2AA00           JNZ  SLREF
00A4 04               INR  B
00A5 C2AA00           JNZ  SLREF
00A8 0670             MVI  B,H028K
00AA 212C00    SLREF: LXI  H,LREFH
00AD 70               MOV  M,B
00AE 212D00           LXI  H,LREFL
00B1 71               MOV  M,C
00B2 210A00           LXI  H,0AH
00B5 3621             MVI  M,21H    ;LXI  H
00B7 23               INX  H
00B8 362F             MVI  M,CTRL AND 0FFH
00BA 23               INX  H
00BB 3600             MVI  M,CTRL SHR 8
00BD 23               INX  H
00BE 3635             MVI  M,35H    ;DCR  M
00C0 23               INX  H
00C1 36C2             MVI  M,0C2H   ;JNZ
00C3 23               INX  H
00C4 3616             MVI  M,16H
00C6 23               INX  H
00C7 3600             MVI  M,00H
00C9 23               INX  H
00CA 362B             MVI  M,2BH    ;DCX  H
00CC 23               INX  H
00CD 3635             MVI  M,35H    ;DCR  M
00CF 23               INX  H
00D0 36CA             MVI  M,0CAH   ;JZ
00D2 23               INX  H
00D3 364D             MVI  M,CYCLE AND 0FFH
00D5 23               INX  H
00D6 3602             MVI  M,CYCLE SHR 8
00D8 23               INX  H
00D9 360C             MVI  M,0CH    ;INR  C
00DB 23               INX  H
00DC 36C0             MVI  M,0C0H   ;RNZ
00DE C34D02           JMP  CYCLE
00E1 0670      S28K:  MVI  B,H028K
00E3 C9               RET
00E4                  ORG  240H
0240 313800    START: LXI  SP,38H   ;INITIALIZE STACK PTR.
0243 D310             OUT  OPCLA
```

```
0245 210800          LXI  H,8H
0248 36DB            MVI  M,0DBH   ;IN
024A 23              INX  H
024B 3608            MVI  M,08H
024D 212800          LXI  H,28H
0250 36C3            MVI  M,0C3H
0252 CD5902          CALL INITA    ;INITIALIZE CHANNEL A
0255 FB      ENINT:  EI            ;ENABLE INTERRUPT
0256 C35502          JMP  ENINT
0259 0670    INITA:  MVI  B,HO28K  ;WRITE PTR.=28K
025B AF              XRA  A
025C D302            OUT  MP       ;CHANNEL A MEMORY
025E 4F              MOV  C,A
025F 5F              MOV  E,A
0260 AF      ZMEM:   XRA  A        ;ZERO MEMORY
0261 02              STAX B
0262 03              INX  B
0263 80              ADD  B
0264 C26002          JNZ  ZMEM
0267 0672            MVI  B,72H    ;WRITE PTR.=28K+512
0269 1670            MVI  D,HO28K  ;READ PTR.=28K
026B 212800          LXI  H,LPFL   ;H,L=LOOP FLAG ADDRESS
026E 77              MOV  M,A      ;LOOP FLAG=0
026F 210A00          LXI  H,0AH
0272 3626            MVI  M,26H    ;MVI  H
0274 23              INX  H
0275 3601            MVI  M,01H
0277 23              INX  H
0278 366F            MVI  M,6FH    ;MOV  L,A
027A 23              INX  H
027B 367E            MVI  M,7EH    ;MOV  A,M
027D 23              INX  H
027E 3602            MVI  M,02H    ;STAX B
0280 23              INX  H
0281 360C            MVI  M,0CH    ;INR  C
0283 23              INX  H
0284 36C0            MVI  M,0C0H   ;RNZ
0286 23              INX  H
0287 3604            MVI  M,04H    ;INR  B
0289 23              INX  H
028A 36C0            MVI  M,0C0H   ;RNZ
028C 23              INX  H
028D 3606            MVI  M,06H    ;MVI  B
028F 23              INX  H
0290 3670            MVI  M,70H
0292 23              INX  H
0293 36C9            MVI  M,0C9H   ;RET
0295 C36E00          JMP  RSET
0298 1A      LOITA:  LDAX D        ;LOOP MODE OUTPUT
0299 2602            MVI  H,02H    ;EXPANSION
029B 6F              MOV  L,A
029C 7E              MOV  A,M
029D D308            OUT  OPA
029F 7B              MOV  A,E      ;READ PTR.-HIGH LIMIT
02A0 91              SUB  C
02A1 7A              MOV  A,D
02A2 98              SBB  B
02A3 CAAD02          JZ   CYCLE
02A6 1C              INR  E        ;INCREMENT READ PTR.
02A7 C0              RNZ
02A8 14              INR  D
02A9 C0              RNZ
02AA 1670            MVI  D,HO28K
02AC C9              RET
02AD DBA0    CYCLE:  IN   IPL      ;INPUT LO LOOP SETTING
02AF CDED02          CALL SCALE
02B2 47              MOV  B,A
02B3 21C003          LXI  H,LREFH
02B6 86              ADD  M
02B7 D2BC02          JNC  OK1
02BA C670            ADI  HO28K
02BC 57      OK1:    MOV  D,A
02BD 21D003          LXI  H,LREFL
02C0 5E              MOV  E,M
02C1 DB90            IN   IPH
02C3 CDED02          CALL SCALE
```

```
02C6 90              SUB   B
02C7 CACD02          JZ    ZNLEN
02CA D2D902          JNC   SCTR
02CD 212E00   ZNLEN: LXI   H,CTRH    ;ZERO OR NEG. LOOP LENGTH
02D0 AF              XRA   A
02D1 3C              INR   A
02D2 77              MOV   M,A
02D3 23              INX   H
02D4 3C              INR   A
02D5 77              MOV   M,A
02D6 C36E00          JMP   RSET
02D9 212E00   SCTR:  LXI   H,CTRH
02DC 77              MOV   M,A
02DD 23              INX   H
02DE AF              XRA   A
02DF 77              MOV   M,A
02E0 42              MOV   B,D
02E1 4B              MOV   C,E
02E2 04              INR   B
02E3 CCE100          CZ    S28K
02E6 04              INR   B
02E7 CCE100          CZ    S28K
02EA C36E00          JMP   RSET
02ED B7       SCALE: ORA   A         ;SCALE 64K TO 36K
02EE 1F              RAR
02EF 67              MOV   H,A
02F0 17              RAL
02F1 94              SUB   H
02F2 1F              RAR
02F3 B7              ORA   A
02F4 1F              RAR
02F5 B7              ORA   A
02F6 1F              RAR
02F7 84              ADD   H
02F8 C9              RET
02F9                 ORG 300H
0300 212900   OUT1:  LXI   H,29H
0303 362A            MVI   M,OUT2 AND 0FFH
0305 1A              LDAX  D
0306 2602            MVI   H,02H
0308 6F              MOV   L,A
0309 AF              XRA   A
030A 86              ADD   M
030B F21C03          JP    POS1
030E 1F              RAR
030F 1F              RAR
0310 1F              RAR
0311 F6E0            ORI   0E0H
0313 D308            OUT   OPA
0315 1C              INR   E
0316 C0              RNZ
0317 14              INR   D
0318 C0              RNZ
0319 1670            MVI   D,H028K
031B C9              RET
031C 1F       POS1:  RAR
031D 1F              RAR
031E 1F              RAR
031F E61F            ANI   1FH
0321 D308            OUT   OPA
0323 1C              INR   E
0324 C0              RNZ
0325 14              INR   D
0326 C0              RNZ
0327 1670            MVI   D,H028K
0329 C9              RET
032A 212900   OUT2:  LXI   H,29H
032D 3652            MVI   M,OUT3 AND 0FFH
032F 1A              LDAX  D
0330 2602            MVI   H,02H
0332 6F              MOV   L,A
0333 AF              XRA   A
0334 86              ADD   M
0335 F24503          JP    POS2
0338 1F              RAR
0339 1F              RAR
```

```
Ø33A E6CØ          ORI   ØCØH
Ø33C D3Ø8          OUT   OPA
Ø33E 1C            INR   E
Ø33F CØ            RNZ
Ø34Ø 14            INR   D
Ø341 CØ            RNZ
Ø342 167Ø          MVI   D,HØ28K
Ø344 C9            RET
Ø345 1F     POS2:  RAR
Ø346 1F            RAR
Ø347 E63F          ANI   3FH
Ø349 D3Ø8          OUT   OPA
Ø34B 1C            INR   E
Ø34C CØ            RNZ
Ø34D 14            INR   D
Ø34E CØ            RNZ
Ø34F 167Ø          MVI   D,HØ28K
Ø351 C9            RET
Ø352 2129ØØ OUT3:  LXI   H,29H
Ø355 3682          MVI   M,OUT4 AND ØFFH
Ø357 1A            LDAX  D
Ø358 26Ø2          MVI   H,Ø2H
Ø35A 6F            MOV   L,A
Ø35B AF            XRA   A
Ø35C 86            ADD   M
Ø35D F271Ø3        JP    POS3
Ø36Ø 1F            RAR
Ø361 1F            RAR
Ø362 F6CØ          ORI   ØCØH
Ø364 67            MOV   H,A
Ø365 37            STC
Ø366 1F            RAR
Ø367 84            ADD   H
Ø368 D3Ø8          OUT   OPA
Ø36A 1C            INR   E
Ø36B CØ            RNZ
Ø36C 14            INR   D
Ø36D CØ            RNZ
Ø36E 167Ø          MVI   D,HØ28K
Ø37Ø C9            RET
Ø371 1F     POS3:  RAR
Ø372 1F            RAR
Ø373 E63F          ANI   3FH
Ø375 67            MOV   H,A
Ø376 B7            ORA   A
Ø377 1F            RAR
Ø378 84            ADD   H
Ø379 D3Ø8          OUT   OPA
Ø37B 1C            INR   E
Ø37C CØ            RNZ
Ø37D 14            INR   D
Ø37E CØ            RNZ
Ø37F 167Ø          MVI   D,HØ28K
Ø381 C9            RET
Ø382 2129ØØ OUT4:  LXI   H,29H
Ø385 36A6          MVI   M,OUT5 AND ØFFH
Ø387 1A            LDAX  D
Ø388 26Ø2          MVI   H,Ø2H
Ø38A 6F            MOV   L,A
Ø38B AF            XRA   A
Ø38C 86            ADD   M
Ø38D F29BØ3        JP    POS4
Ø39Ø 37            STC
Ø391 1F            RAR
Ø392 D3Ø8          OUT   OPA
Ø394 1C            INR   E
Ø395 CØ            RNZ
Ø396 14            INR   D
Ø397 CØ            RNZ
Ø398 167Ø          MVI   D,HØ28K
Ø39A C9            RET
Ø39B B7     POS4:  ORA   A
Ø39C 1F            RAR
Ø39D D3Ø8          OUT   OPA
Ø39F 1C            INR   E
Ø3AØ CØ            RNZ
```

```
03A1 14               INR  D
03A2 C0               RNZ
03A3 1670             MVI  D,HO2RK
03A5 C9               RET
03A6 212900   OUT5:   LXI  H,29H
03A9 36D6             MVI  M,OUT6 AND 0FFH
03AB 1A               LDAX D
03AC 2602             MVI  H,02H
03AE 6F               MOV  L,A
03AF AF               XRA  A
03B0 86               ADD  M
03B1 F2C503           JP   POS5
03B4 37               STC
03B5 1F               RAR
03B6 67               MOV  H,A
03B7 1F               RAR
03B8 1F               RAR
03B9 F6F0             ORI  0F0H
03BB 84               ADD  H
03BC D308             OUT  OPA
03BE 1C               INR  E
03BF C0               RNZ
03C0 14               INR  D
03C1 C0               RNZ
03C2 1670             MVI  D,HO2RK
03C4 C9               RET
03C5 B7       POS5:   ORA  A
03C6 1F               RAR
03C7 67               MOV  H,A
03C8 1F               RAR
03C9 1F               RAR
03CA E61F             ANI  1FH
03CC 84               ADD  H
03CD D308             OUT  OPA
03CF 1C               INR  E
03D0 C0               RNZ
03D1 14               INR  D
03D2 C0               RNZ
03D3 1670             MVI  D,HO2RK
03D5 C9               RET
03D6 210304   OUT6:   LXI  H,OUT7
03D9 222900           SHLD 29H
03DC 1A               LDAX D
03DD 2602             MVI  H,02H
03DF 6F               MOV  L,A
03E0 AF               XRA  A
03E1 86               ADD  M
03E2 F2F403           JP   POS6
03E5 37               STC
03E6 1F               RAR
03E7 67               MOV  H,A
03E8 37               STC
03E9 1F               RAR
03EA 84               ADD  H
03EB D308             OUT  OPA
03ED 1C               INR  E
03EE C0               RNZ
03EF 14               INR  D
03F0 C0               RNZ
03F1 1670             MVI  D,HO2RK
03F3 C9               RET
03F4 B7       POS6:   ORA  A
03F5 1F               RAR
03F6 67               MOV  H,A
03F7 B7               ORA  A
03F8 1F               RAR
03F9 84               ADD  H
03FA D308             OUT  OPA
03FC 1C               INR  E
03FD C0               RNZ
03FE 14               INR  D
03FF C0               RNZ
0400 1670             MVI  D,HO2RK
0402 C9               RET
0403 3A3000   OUT7:   LDA  30H
0406 322900           STA  29H
```

```
0409 1A              LDAX D
040A 2602            MVI  H,02H
040C 6F              MOV  L,A
040D AF              XRA  A
040E 86              ADD  M
040F F22404          JP   POS7
0412 67              MOV  H,A
0413 1F              RAR
0414 1F              RAR
0415 1F              RAR
0416 F6E0            ORI  0E0H
0418 2F              CMA
0419 3C              INR  A
041A 84              ADD  H
041B D300            OUT  OPA
041D 1C              INR  E
041E C0              RNZ
041F 14              INR  D
0420 C0              RNZ
0421 1670            MVI  D,H028K
0423 C9              RET
0424 67      POS7:   MOV  H,A
0425 1F              RAR
0426 1F              RAR
0427 1F              RAR
0428 E61F            ANI  1FH
042A 2F              CMA
042B 3C              INR  A
042C 84              ADD  H
042D D300            OUT  OPA
042F 1C              INR  E
0430 C0              RNZ
0431 14              INR  D
0432 C0              RNZ
0433 1670            MVI  D,H028K
0435 C9              RET
0436 1A      OUTA1:  LDAX D
0437 2602            MVI  H,02H
0439 6F              MOV  L,A
043A 7E              MOV  A,M
043B D300            OUT  OPA
043D 1C              INR  E
043E F0              RP
043F 210000          LXI  H,OUTTH
0442 222900          SHLD 29H
0445 C9              RET
0446 1A      OUTA2:  LDAX D
0447 2602            MVI  H,02H
0449 6F              MOV  L,A
044A 7E              MOV  A,M
044B D300            OUT  OPA
044D 1C              INR  E
044E F0              RP
044F 212900          LXI  H,29H
0452 3655            MVI  M,OUTM2 AND 0FFH
0454 C9              RET
0455 1A      OUTM2:  LDAX D
0456 2602            MVI  H,02H
0458 6F              MOV  L,A
0459 7E              MOV  A,M
045A D300            OUT  OPA
045C 1C              INR  E
045D 3E40            MVI  A,40H
045F 83              ADD  E
0460 F8              RM
0461 210000          LXI  H,OUTTH
0464 222900          SHLD 29H
0467 C9              RET
0468 1A      OUTA3:  LDAX D          ;OUTPUT CHANNEL A
0469 2602            MVI  H,02H      ;EXPANSION
046B 6F              MOV  L,A
046C 7E              MOV  A,M
046D D300            OUT  OPA        ;OUTPUT CHANNEL A
046F 1C              INR  E          ;INCREMENT READ PTR.
0470 F8              RM
0471 14              INR  D
```

```
0472 C27704          JNZ  SETTH
0475 1670            MVI  D,H028K ;RESET READ PTR.
0477 214000   SETTH: LXI  H,OUTTH
047A 222900          SHLD 29H
047D C9              RET
047E 1A       OUTA4: LDAX D
047F 2602            MVI  H,02H
0481 6F              MOV  L,A
0482 7E              MOV  A,M
0483 D308            OUT  OPA
0485 1C              INR  E
0486 F8              RM
0487 14              INR  D
0488 C28D04          JNZ  SETP2
048B 1670            MVI  D,H028K
048D 212900   SETP2: LXI  H,29H
0490 3693            MVI  M,OUTP2 AND 0FFH
0492 C9              RET
0493 1A       OUTP2: LDAX D
0494 2602            MVI  H,02H
0496 6F              MOV  L,A
0497 7E              MOV  A,M
0498 D308            OUT  OPA
049A 1C              INR  E
049B 3EC0            MVI  A,0C0H
049D 83              ADD  E
049E F8              RM
049F 214000          LXI  H,OUTTH
04A2 222900          SHLD 29H
04A5 C9              RET
FE00          M512   EQU  -512D
0070          H028K  EQU  70H
0008          IPA    EQU  8D        ;CH. A INPUT PORT
0008          OPA    EQU  8D        ;CH. A OUTPUT PORT
0000          MP     EQU  0D        ;MEMORY SELECT PORT
0040          IPL    EQU  040H      ;LO LOOP SETTING PORT
0090          IPH    EQU  90H       ;HI LOOP SETTING PORT
0010          OPCLA  EQU  10H       ;CLEAR LOOP INTERRUPT PORT
04A6                 ORG  100H          ;NONLINEAR COMPANDING (U=14)
0100 0001     CMPT:  DB   0D,1D
0102 0203            DB   2D,3D
0104 0405            DB   4D,5D
0106 0607            DB   6D,7D
0108 0808            DB   8D,8D
010A 0909            DB   9D,9D
010C 0A0B            DB   10D,11D
010E 0B0C            DB   11D,12D
0110 0C0D            DB   12D,13D
0112 0D0D            DB   13D,13D
0114 0E0E            DB   14D,14D
0116 0F0F            DB   15D,15D
0118 0F10            DB   15D,16D
011A 1010            DB   16D,16D
011C 1111            DB   17D,17D
011E 1112            DB   17D,18D
0120 1212            DB   18D,18D
0122 1213            DB   18D,19D
0124 1313            DB   19D,19D
0126 1314            DB   19D,20D
0128 1414            DB   20D,20D
012A 1415            DB   20D,21D
012C 1515            DB   21D,21D
012E 1516            DB   21D,22D
0130 1616            DB   22D,22D
0132 1616            DB   22D,22D
0134 1717            DB   23D,23D
0136 1717            DB   23D,23D
0138 1717            DB   23D,23D
013A 1818            DB   24D,24D
013C 1818            DB   24D,24D
013E 1819            DB   24D,25D
0140 1919            DB   25D,25D
0142 1919            DB   25D,25D
0144 1919            DB   25D,25D
0146 1A1A            DB   26D,26D
0148 1A1A            DB   26D,26D
014A 1A1A            DB   26D,26D
014C 1A1B            DB   26D,27D
```

```
014E 1B1B             DB    27D,27D
0150 1B1B             DB    27D,27D
0152 1B1B             DB    27D,27D
0154 1C1C             DB    28D,28D
0156 1C1C             DB    28D,28D
0158 1C1C             DB    28D,28D
015A 1C1C             DB    28D,28D
015C 1D1D             DB    29D,29D
015E 1D1D             DB    29D,29D
0160 1D1D             DB    29D,29D
0162 1D1D             DB    29D,29D
0164 1D1E             DB    29D,30D
0166 1E1E             DB    30D,30D
0168 1E1E             DB    30D,30D
016A 1E1E             DB    30D,30D
016C 1E1E             DB    30D,30D
016E 1E1F             DB    30D,31D
0170 1F1F             DB    31D,31D
0172 1F1F             DB    31D,31D
0174 1F1F             DB    31D,31D
0176 1F1F             DB    31D,31D
0178 1F1F             DB    31D,31D
017A 1F1F             DB    31D,31D
017C 1F1F             DB    31D,31D
017E 1F1F             DB    31D,31D
0180 E0E0             DB    -32D,-32D
0182 E0E0             DB    -32D,-32D
0184 E0E0             DB    -32D,-32D
0186 E0E1             DB    -32D,-31D
0188 E1E1             DB    -31D,-31D
018A E1E1             DB    -31D,-31D
018C E1E1             DB    -31D,-31D
018E E1E1             DB    -31D,-31D
0190 E1E1             DB    -31D,-31D
0192 E2E2             DB    -30D,-30D
0194 E2E2             DB    -30D,-30D
0196 E2E2             DB    -30D,-30D
0198 E2E2             DB    -30D,-30D
019A E2E2             DB    -30D,-30D
019C E3E3             DB    -29D,-29D
019E E3E3             DB    -29D,-29D
01A0 E3E3             DB    -29D,-29D
01A2 E3E3             DB    -29D,-29D
01A4 E3E4             DB    -29D,-28D
01A6 E4E4             DB    -28D,-28D
01A8 E4E4             DB    -28D,-28D
01AA E4E4             DB    -28D,-28D
01AC E4E5             DB    -28D,-27D
01AE E5E5             DB    -27D,-27D
01B0 E5E5             DB    -27D,-27D
01B2 E5E5             DB    -27D,-27D
01B4 E6E6             DB    -26D,-26D
01B6 E6E6             DB    -26D,-26D
01B8 E6E6             DB    -26D,-26D
01BA E6E7             DB    -26D,-25D
01BC E7E7             DB    -25D,-25D
01BE E7E7             DB    -25D,-25D
01C0 E7E7             DB    -25D,-25D
01C2 E8E8             DB    -24D,-24D
01C4 E8E8             DB    -24D,-24D
01C6 E8E9             DB    -24D,-23D
01C8 E9E9             DB    -23D,-23D
01CA E9E9             DB    -23D,-23D
01CC E9EA             DB    -23D,-22D
01CE EAEA             DB    -22D,-22D
01D0 EAEA             DB    -22D,-22D
01D2 EBEB             DB    -21D,-21D
01D4 EBEB             DB    -21D,-21D
01D6 ECEC             DB    -20D,-20D
01D8 ECEC             DB    -20D,-20D
01DA EDED             DB    -19D,-19D
01DC EDED             DB    -19D,-19D
01DE EEEE             DB    -18D,-18D
01E0 EEEE             DB    -18D,-18D
01E2 EFEF             DB    -17D,-17D
01E4 EFF0             DB    -17D,-16D
01E6 F0F0             DB    -16D,-16D
01E8 F1F1             DB    -15D,-15D
01EA F1F2             DB    -15D,-14D
```

```
01EC  F2F3              DB    -14D,-13D
01EE  F3F3              DB    -13D,-13D
01F0  F4F4              DB    -12D,-12D
01F2  F5F5              DB    -11D,-11D
01F4  F6F7              DB    -10D,-9D
01F6  F7F8              DB    -9D,-8D
01F8  F8F9              DB    -8D,-7D
01FA  FAFB              DB    -6D,-5D
01FC  FCFD              DB    -4D,-3D
01FE  FEFF              DB    -2D,-1D
0200  0001      EXPT:   DB    0D,1D
0202  0203              DB    2D,3D
0204  0405              DB    4D,5D
0206  0607              DB    6D,7D
0208  090B              DB    9D,11D
020A  0C0E              DB    12D,14D
020C  1012              DB    16D,18D
020E  1517              DB    21D,23D
0210  1A1D              DB    26D,29D
0212  2125              DB    33D,37D
0214  292D              DB    41D,45D
0216  3237              DB    50D,55D
0218  3D43              DB    61D,67D
021A  4951              DB    73D,81D
021C  5961              DB    89D,97D
021E  6[illegible]75    DB    1[illegible]D,117D
[illegible]             DB    -1[illegible]D,-117[illegible]
[illegible]             DB    -1[illegible]D,-97[illegible]
[illegible]24  [illegible]  DB    -89D,-81D
0226  B7BD              DB    -73D,-67D
0228  C3C9              DB    -61D,-55D
022A  CED3              DB    -50D,-45D
022C  D7DB              DB    -41D,-37D
022E  DFE3              DB    -33D,-29D
0230  E6E9              DB    -26D,-23D
0232  EBEE              DB    -21D,-18D
0234  F0F2              DB    -16D,-14D
0236  F4F5              DB    -12D,-11D
0238  F7F9              DB    -9D,-7D
023A  FAFB              DB    -6D,-5D
023C  FCFD              DB    -4D,-3D
023E  FEFF              DB    -2D,-1D
0000                    END

P=
```

In addition to the instructions previously discussed with regard to Table I, there is also shown in the program listing the instructions for each of the various routines and operational steps of FIG. 12. The program listing of Table I is for a single channel operation of the system as detailed in FIGS. 9–11. The program listing is thus a step-by-step summary of the operation of the system of the present invention as outlined by the flow diagram of FIG. 12.

While only one embodiment of the invention, together with modifications thereof, has been described in detail herein and shown in the accompanying drawings, it will be evident that various further modifications are possible without departing from the scope of the invention.

What is claimed is:

1. Apparatus for rate conversion of audio signals, comprising in combination:

data storage means having address locations for storing digital data representing audio signals, means for transferring digital data representing an audio signal to write address locations in said data storage means at an input rate, means for retrieving the digital data from read address locations in said data storage means at a readout rate independent of the input rate, means for monitoring the address differential between the read address locations and the write address locations, means for resetting the means for retrieving at a preselected address differential from said means for transferring when the address differential exceeds preestablished maximum or minimum limits, and means for generating an audio signal in analog format from the retrieved digital data at the readout rate.

2. Apparatus for rate conversion of audio signals as set forth in claim 1 further comprising means for controlling the input rate for transferring data to said data storage means.

3. Apparatus for rate conversion of audio data signals, comprising in combination:

means for recording audio data signals, means for converting the audio data signals from said means for recording into digital data, data storage means for storing the digital data representing the audio signals, means for transferring digital data representing audio signals to said data storage means at an input rate, means for retrieving the digital data from the data storage means at a processing rate independent of the input rate, means for generating an audio signal in analog format from the retrieved digital data at the processing rate, and control means for selectively interrupting for play-back said means for transferring to prevent digital data from being transferred to said data storage means and for restricting said means for retrieving to respond to preselected digital data in said data storage means.

4. Apparatus for rate conversion of audio data signals as set forth in claim 3 wherein said means for recording includes means for varying the rate at which data signals are supplied from the means for recording.

5. Apparatus for rate conversion of audio data signals as set forth in claim 4 including speed control means for generating a rate signal to said means for varying.

6. Apparatus for rate conversion of audio data signals as set forth in claim 3 wherein said control means further includes means for varying the restriction of digital words from a maximum upper limit to a minimum lower limit of such digital data.

7. The method of rate conversion of analog audio data signals comprising:

converting the analog audio data signals to digital data signals, storing the digital data signals at successive storing address locations of a storage memory, reading out the digital data signals at successive reading out address locations of a storage memory, controlling the number of address locations between the current reading out address location, and the contemporaneously occurring storing address location to within a preselected maximum and minimum number of address locations, and converting the read out digital data signals into audio signals having an analog format.

8. The method of rate conversion of analog audio data signals as set forth in claim 7 including the step of selectively interrupting for play-back the storing of data signals at address locations, and repetitively reading out other data signals at preselected address locations.

9. The method of rate conversion of analog audio data signals as set forth in claim 7 including the step of controlling the rate at which audio data signals are stored at address locations.

10. The method of rate conversion of analog audio data signals as set forth in claim 9 wherein the difference between the reading out address locations and the storing address locations varies with the rate at which audio data signals are stored at address locations.

11. The method of rate conversion of analog audio data signals as set forth in claim 7 including the step of controlling the rate at which audio data signals are converted into digital data, and controlling the rate at which the digital data is stored at address locations.

12. Apparatus for rate conversion of analog audio signals, comprising in combination:

data storage means having address locations for storing digital data samples representing audio signals and including a read pointer for determining read address locations and a write pointer for determining write address locations, means for transferring digital data samples representing an audio signal to the write address locations of said data storage means at an input rate, means for retrieving the digital data samples from the read address locations of said data storage means at a readout data independent of the input rate, means for resetting the read pointer to determine the next read address location for each data sample retrieved from said data storage means, means for generating an audio signal in analog format from the retrieved digital data samples at the readout rate, and control means for setting an initial address differential between the read pointer and the write pointer of said data storage means, said control means including means for selectively interrupting for play-back said means for transferring to prevent digital data from being transferred to said data storing means and for restricting said means for retrieving to respond to preselected digital data samples in said data storage means for repetitively retrieving the preselected digital data, said means for generating being selectively operable to repetitively generate an audio signal corresponding to the preselected digital data.

13. Apparatus for rate conversion of analog audio signals as set forth in claim 12 including operator input means for setting the operation of said means for transferring and said means for retrieving in a variable speech rate mode or a loop retrieval mode.

14. Apparatus for rate conversion of analog audio signals as set forth in claim 13 wherein said operator input means further includes means for setting the start address of the read pointer and the end address of the read pointer for operation in the loop retrieval mode.

15. Apparatus for rate conversion of audio signals, comprising in combination:

data storage means having address locations for storing digital data samples representing audio signals and including a read pointer for determining a read address location and a write pointer for determining a write address location, means for transferring digital data samples representing an audio signal to the write address locations in said data storage means at an input rate, means for retrieving the digital data samples from the read address locations in said data storage means at a readout rate independent of the input rate, means for evaluating the address differential between the read pointer and the write pointer and generating a reset signal when the address differential exceeds minimum or maximum limits, means for resetting the read pointer to a preestablished address differential with respect to the write pointer in response to the reset signal, and means for generating an audio signal in analog format from the retrieved digital data samples at the readout rate.

16. Apparatus for rate conversion of audio signals as set forth in claim 15 including control means for setting the initial address differential between the read pointer and the write pointer.

17. Apparatus for rate conversion of audio signals as set forth in claim 16 wherein said control means includes means for selectively interrupting for play-back said means for transferring to prevent digital data signals from being transferred to said data storage means and for restricting said means for retrieving to respond to preselected digital data samples in said data storage means.

18. Apparatus for rate conversion of audio signals as set forth in claim 17 wherein said control means restricts said means for retrieving by establishing a start address for the read pointer and an end address for the read pointer of said data storage means.

19. Apparatus for rate conversion of audio signals as set forth in claim 15 including means for resetting the read pointer address with respect to the write pointer address for each data sample retrieved from said data storage means.

20. The method of rate conversion of digital audio data signals to analog audio signals comprising:

storing digital audio data samples of the data signals at write address locations of a storage memory having a read pointer for determining read address locations and a write pointer for determining the write address locations, reading out the audio data samples at the read address locations, resetting the read pointer address to determine the next read address location for each data sample retrieved from the storage memory, selectively interrupting for play-back the storing of data samples at address locations of the storage means for preventing data samples from being stored in the storage means, repetitively reading out other data samples at preselected address locations, and converting the readout audio data samples into audio signals having an analog format.

21. The method of rate conversion of digital audio data signals as set forth in claim 20 including the step of setting the initial address differential between the read pointer and the write pointer of the storage memory.

22. The method of rate conversion of digital audio data signals as set forth in claim 20 including the step of setting the start address and end address of the read pointer when repetitively reading out data samples.

23. The method of rate conversion of analog audio data signals, comprising:

converting the analog audio data signals to digital data signals, storing data samples of the digital data signals at the write address locations of a storage memory having a read pointer for determining the read address locations and a write pointer for determining write address locations, reading out the digital data signals from the read address locations, comparing the address differential between the read pointer and the write pointer against a preestablished differential and generating a reset signal when the address differential exceeds minimum or maximum limits, resetting the read pointer to a preestablished address differential with respect to the write pointer in response to the reset signal, and converting the readout digital data samples into audio signals having an analog format.

24. The method of rate conversion of analog audio data signals as set forth in claim 23 including the step of weighting each data sample after generating the reset signal to change the amplitude of the data sample prior to resetting the read pointer.

25. The method of rate conversion of analog audio data signals as set forth in claim 24 wherein subsequent data samples after the generation of the reset signal are each weighted with a different weighting factor.

26. The method of rate conversion of analog audio data signals as set forth in claim 24 including the step of comparing the magnitude of a read data sample after weighting with a threshold level, and interrupting the resetting of the read pointer with respect to the write pointer after the generation of the reset signal for data samples above the threshold level.

27. The method of rate conversion of analog audio data signals as set forth in claim 23 including the step of resetting the read pointer address with respect to the write pointer address for each data sample retrieved from said data storage means.

* * * * *